United States Patent [19]

Wilkinson

[11] Patent Number: 5,058,394
[45] Date of Patent: Oct. 22, 1991

[54] HYBRID AIR CONDITIONING SYSTEM SUBSYSTEM INTEGRATION

[75] Inventor: William H. Wilkinson, Columbus, Ohio

[73] Assignee: Battelle Memorial Institute, Columbus, Ohio

[21] Appl. No.: 475,811

[22] Filed: Feb. 6, 1990

[51] Int. Cl.⁵ .............................................. F25D 23/00
[52] U.S. Cl. .......................................... 62/271; 62/94; 62/476
[58] Field of Search ...................... 62/271, 94, 476, 93

[56] References Cited

U.S. PATENT DOCUMENTS 3,247,679 4/1966 Meckler ................................. 62/271
4,222,244 9/1980 Meckler ................................. 62/271

Primary Examiner—Henry A. Bennett
Assistant Examiner—John Sollecito
Attorney, Agent, or Firm—Watkins, Dunbar and Pollick

[57] ABSTRACT

A hybrid air-conditioning system having an absorption refrigeration subsystem for sensible heat loads and a cooperating liquid desiccant dehumidification subsystem for latent heat loads incorporates additional apparatus for effecting the efficient transfer of available heat between the subsystems to improve the total system Coefficient of Performance (C.O.P.) over a wide range of latent heat load to sensible heat load proportions. Available heat recovery and system internal load generation are utilized in high and low latent load ratio regions, and modulated heat transfer using an additional series absorption refrigeration cycle loop is optionally utilized in the mid-latent heat load ratio region.

31 Claims, 12 Drawing Sheets

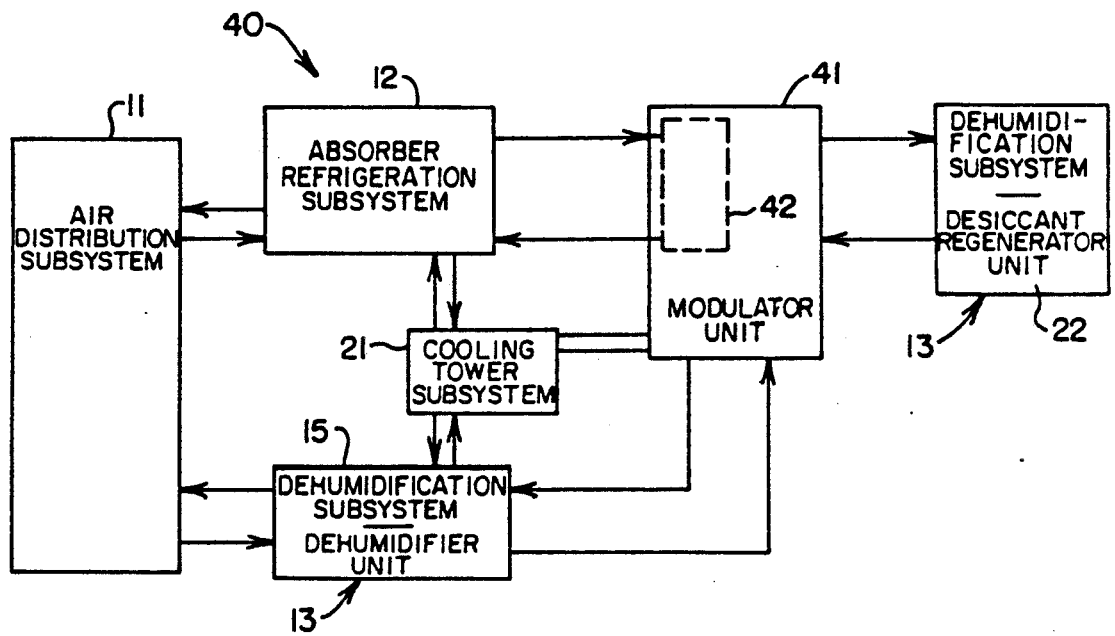
FIG. 6
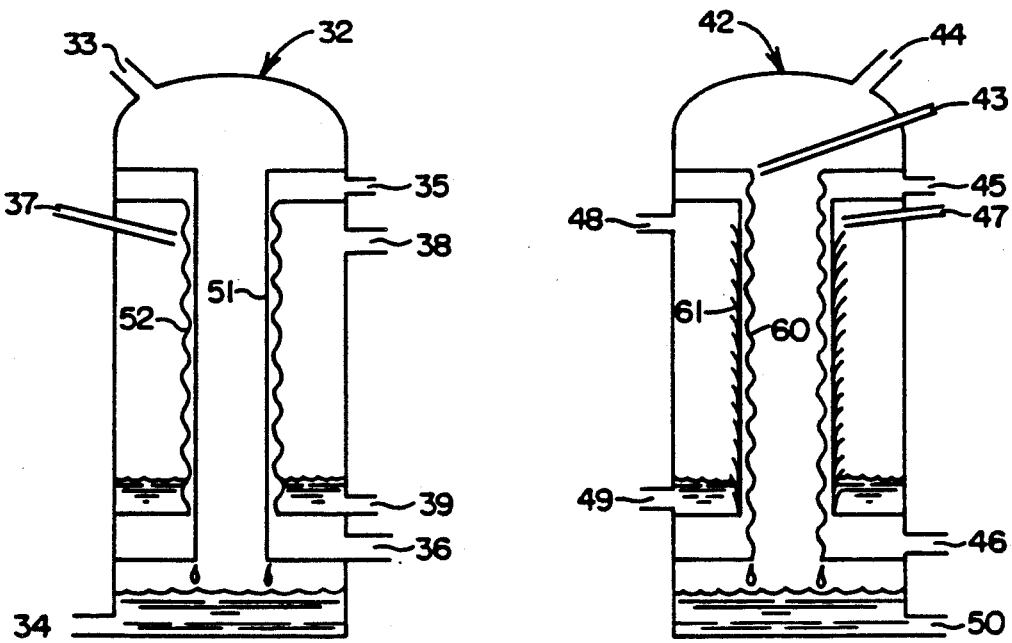
FIG. 7
FIG. 8

HYBRID AIR CONDITIONING SYSTEM SUBSYSTEM INTEGRATION

FIELD OF THE INVENTION

The present invention relates generally to air conditioning, and particularly concerns improved apparatus and methods for reducing the temperature and relative humidity of air circulated within an enclosed space such as a building interior.

More specifically, the invention concerns a hybrid-type of air conditioning system wherein sensible heat loads are handled by an absorption refrigeration subsystem, wherein latent heat loads are handled by a cooperating liquid desiccant dehumidification subsystem, and wherein variations in systems loads and load proportioning are handled by novel subsystem integration apparatus and methods to improve total system thermodynamic efficiency performance.

BACKGROUND OF THE INVENTION

Numerous applications of desiccant dehumidification to the conditioning of air are known in the prior art. Meckler U.S. Pat. Nos. 3,401,530 and 3,488,971, and Griffiths U.S. Pat. No. 4,164,125, for instance, utilize a solid desiccant for the application. Similarly, Meckler U.S. Pat. No. 4,011,731, and Turner U.S. Pat. No. 4,171,620 teach the use of a desiccant in the conditioning of air but emphasize the use of liquid desiccant materials. Also, Meckler's U.S Pat. No. 3,102,399 suggests a building air conditioning system wherein make-up ventilation air is subjected to liquid desiccant dehumidification in a two-stage dehumidification process to improve total system performance efficiency but is forced to use a two-stage dehumidification process.

Meckler et al. U.S. Pat. No. 4,171,624 teaches the use of thermal compressor means to regenerate or concentrate a dilute desiccant solution. Meckler also, in U.S. Pat. No. 4,222,244 for example, teaches the use of solar energy in desiccant regeneration for an air conditioning system. See also Meckler U.S. Pat. No. 4,577,471 in the regard.

Griffiths U.S. Pat. No. 4,259,849 also teaches the use of heat obtained from the condenser of a conventional vapor compression refrigeration system for effecting liquid desiccant regeneration.

Meckler U.S. Pat. No. 3,247,679 discloses an engine-driven vapor compression refrigeration subsystem in a comfort conditioning system that also utilizes a liquid desiccant dehumidification subsystem. Meckler's U.S. Pat. No. 3,153,914 teaches air conditioning with a liquid desiccant dehumidification dehumidifier but without supplemental refrigeration.

U.S. Pat. No. 2,981,078 discloses air cooling dehumidification and dehumidification using a hydroscopic agent and a rotating foraminous disk partially immersed in the agent. Supplemental absorption or mechanical refrigeration is not suggested.

Taylor U.S. Pat. No. 2,355,828 discloses an earlier combined refrigeration and dehumidification air conditioning system.

Mattern, et al. U.S. Pat. No. 2,262,954, discloses an air dehumidification system with controls to prevent desiccant crystallization during liquid desiccant regeneration. Richardson U.S. Pat. No. 20,257,204 also teaches liquid desiccant regeneration in a manner that improves the reclamation of waste heat.

For other variations of air conditioning systems employing liquid desiccant solutions for dehumidification of air, see U.S. Pat. Nos. 4,635,446, 4,691,530, and 4,723,417, all issued in the name of Meckler.

SUMMARY OF THE INVENTION

A building air conditioning system configured in accordance with the present invention is comprised of a refrigeration subsystem and a cooperating liquid desiccant dehumidification subsystem. The refrigeration subsystem, in one embodiment of the invention, is preferably an absorption chiller fueled by a natural gas energy source. Such refrigeration subsystem provides available heat to the liquid desiccant dehumidification subsystem for the purpose of effecting or assisting in effecting liquid desiccant regeneration (dilute desiccant solution concentration) in the latter subsystem without penalizing the efficiency of the refrigeration subsystem. Also, the refrigeration subsystem is provided in the invention for the purpose of effecting air temperature variation and control by handling the system sensible heat load associated with air circulated within the building air conditioned, enclosed space.

The liquid desiccant dehumidification subsystem is provided in the invention for the purpose of effecting conditioned air relative humidity variation and control by handling the total system latent heat load associated with the air circulated within the building air conditioned, enclosed space. In the preferred embodiment of the present invention, a building air-conditioned, enclosed space is or may be continuously or very nearly continuously provided with fractional ventilation air from outside the enclosed space, and relative humidity control is effected by processing that ventilation air fraction through the liquid desiccant dehumidification subsystem to accomplish moisture removal from the processed air. The processed fractional ventilation air is then combined (mixed) with air recirculated from the enclosed space and the resulting mixed air is lowered in temperature by the air conditioning system refrigeration subsystem.

To achieve an improved coefficient of performance for the total system, and also to achieve economic advantages by way of reduced equipment acquisition costs and by way of reduced operating fuel or energy costs, I utilize available heat from the refrigeration subsystem to effect, at least in part, either increased liquid desiccant regeneration in the liquid desiccant dehumidification subsystem portion of the total air conditioning system or increased refrigerant production for the absorption refrigeration subsystem potion of the total system. Such available heat may sometimes be characterized as reject heat. Additionally, particular cooling tower and air-to-air heat exchanger components may be advantageously incorporated into such liquid desiccant dehumidification subsystem to further improve total air conditioning system performance.

When integrating the liquid desiccant dehumidification subsystem to configure the total hybrid air conditioning system, I recover heat from the refrigeration subsystem condenser and/or absorber elements through various system operation steps and/or system added apparatus elements to improve total system thermodynamic efficiency performance in manners which accommodate varying system sensible heat loads and latent heat loads, both as to their individual magnitudes and relative proportioning. Such may be accomplished without the necessity of providing system supplementary heat, and in certain cases is accomplished by switching the utilization of available heat, for instance, from desiccant regeneration to simple heat rejection in response to a reduced latent heat load. Other invention cases involve the utilization of modulator assemblies interposed cooperatively between the system refrigeration subsystem and the system desiccant regenerator unit and operable to utilize either refrigeration subsystem absorber reject heat recovery or condenser reject heat recovery, preferably with a degree of heat recovery modulation, to significantly improve total system performance in a manner which is somewhat more complex from an apparatus standpoint. Thus, the present invention basically includes the utilization of control apparatus and/or operating parameter modification, either individually or in combination, to shift "reject" heat flow progressively to either of two thermodynamically useful system functions—increased desiccant regeneration or increased refrigerant production—by means of novel thermodynamic cycles. Such utilization involves the recovery of heat values from fixed heat flows in the refrigeration subsystem condenser, absorber, or combined condenser and absorber elements, from modulated heat flows in the refrigeration subsystem condenser, absorber, or combined condenser and absorber elements, and from combined fixed and modulated heat flows in such refrigeration subsystem elements and element combinations, all in relation to the system dehumidification subsystem liquid desiccant regeneration apparatus and methods.

The foregoing and other advantages of the invention will become apparent from the following disclosure in which a preferred embodiment of the invention is described in detail and illustrated in the accompanying drawings. It is contemplated that variations and structural features and arrangement of parts may appear to the person skilled in the art, without departing from the scope of sacrificing any of the advantages of the invention which is delineated in the included claims.

DESCRIPTION OF THE DRAWINGS

FIG. 6 is a functional block diagram of another form of a representative hybrid air conditioning system incorporating a modulator unit which integrates, in a hybrid air conditioning system, the liquid desiccant dehumidification subsystem with the absorption refrigeration subsystem to advantageously utilize available absorber element heat.

FIGS. 7 and 8 are schematic sectional elevations of the modulation unit or assembly respectively incorporated into each of the systems of FIGS. 5 and 6.

DETAILED DESCRIPTION OF THE INVENTION

Figure 1:
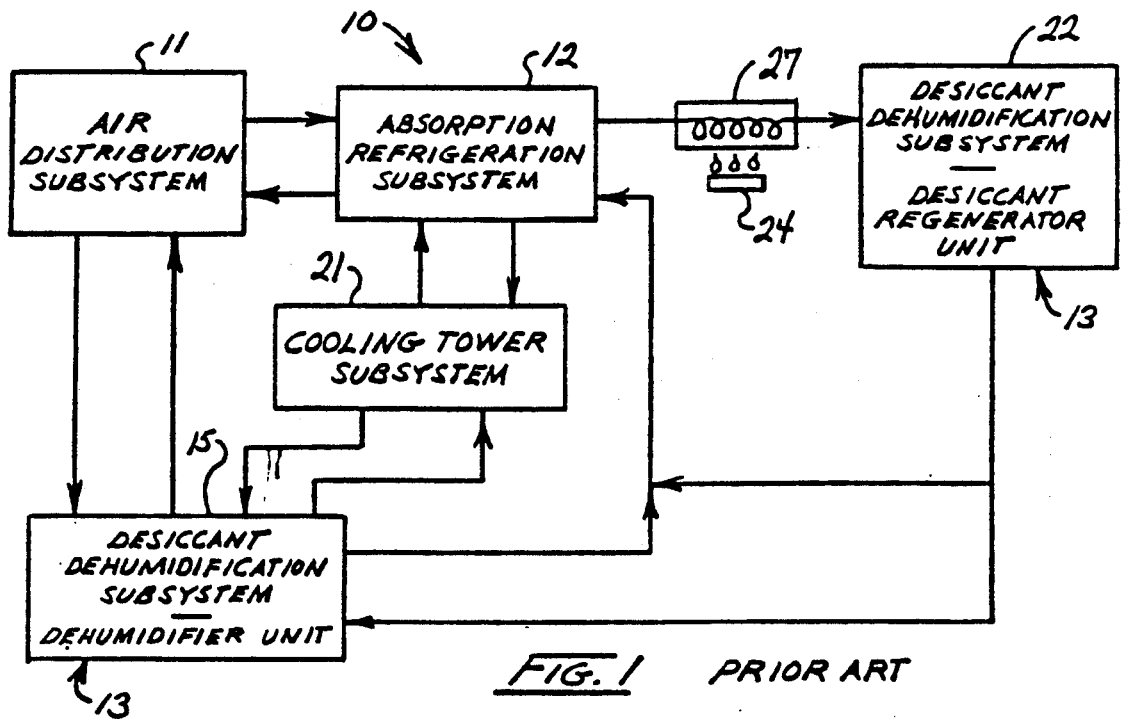
FIG. 1 is a functional block diagram of a representative known hybrid-type of air conditioning system to which the present invention may be adapted to obtain improved system thermodynamic performance operating efficiencies in a range of varying operating conditions.

Hybrid air conditioning systems of the type generally combining an absorption refrigeration subsystem with a liquid desiccant dehumidification subsystem are previously known, and one such system 10 is illustrated by the functional block diagram of FIG. 1 and corresponds essentially to the type of hybrid air conditioning system disclosed in allowed U.S. patent application Ser. No. 07,302,428, filed Jan. 27, 1989, and issued Mar. 6, 1990 as U.S. Pat. No. 4,905,479.

Such system includes in part, an air distribution subsystem 11 that recirculates air returned from within an enclosed building space for reconditioning which typically involves air cooling and a lowering of air relative humidity. Cooling is accomplished in system 10 by absorption chiller refrigeration subsystem 12 and dehumidification or relative humidity control is accomplished by liquid desiccant dehumidification subsystem 13. Subsystem 13 may process fractional ventilation air received from the ambient atmosphere outside the system and also a controlled portion of the return air as diverted from air distribution subsystem 11. Such ventilation air, after processing in the dehumidifier unit portion 15 of subsystem 13 for dehumidification, is flowed back to air distribution subsystem 11 for mixing with the remaining return air and for subsequent cooling by chilled water received from refrigeration subsystem 12.

Refrigeration subsystem 12 is conventional in construction and typically includes, inter alia, an evaporator heat exchanger component, a condenser heat exchanger component, and an absorber heat exchanger component. Also, such typical absorption chiller subsystem includes an energy or heat source, such as a natural gas burner (not shown in the drawings). Further, refrigeration subsystem 12 may be provided in the form of a double-effect subsystem. Subsystem 12 functions to desorb, condense, evaporate, and re-absorb refrigerant from an absorption refrigerant pair such as a lithium bromide and water solution. The refrigerant passed through the absorption refrigeration subsystem evaporator heat exchanger cools or chills water that is circulated separately to and through distribution subsystem 11 to effect temperature changes in the combined recirculated and ventilation airflows and thus handle the building sensible heat load.

The FIG. 1 cooling tower subsystem 21 is conventional and cooperates with the absorption refrigeration subsystem 12 through a subsystem in the refrigeration absorber heat exchanger component and with the liquid desiccant dehumidification subsystem 13 through a heat exchanger in the dehumidification subsystem dehumidifier unit 15. Also, the liquid desiccant dehumidification subsystem 13 cooperates with absorption refrigeration subsystem 12 through the flow of relatively dilute desiccant solution to and through the (dilute) subsystem 12 condenser exchanger component. The desiccant dehumidification subsystem 13 is principally comprised of dehumidifier unit 15 and desiccant regenerator unit 22, and the desiccant solution utilized in subsystem 13 is typically an aqueous solution of lithium chloride, lithium bromide, ethylene glycol, etc.

A liquid desiccant such as a relatively concentrated lithium chloride solution is flowed in the prior hybrid system from the collector of desiccant regenerator unit 22 to a sprayer in subsystem dehumidifier unit 15. The concentrated (or "strong") desiccant solution is sprayed in dehumidifier unit 15 into the stream of ventilation air received from air distribution subsystem 11 and reduces the water content of that ventilation air to the desired reduced level by absorption of the "excess" moisture into the desiccant solution thus causing the solution to become a diluted (or "weak") desiccant solution. The dilute desiccant solution is flowed in heat exchange relation to the refrigeration subsystem condenser heat exchanger component for heating and afterwards the heated desiccant relatively dilute solution is sprayed into a desiccant packed regeneration bed 39 situated in the ductwork of regenerator unit 22.

As schematically illustrated in FIG. 1, hybrid system 10 may optionally also include an auxiliary heat source such as auxiliary gas burner 24 which is selectively operable to heat a medium in heat exchanger 37 and to transfer such heat to the relatively dilute desiccant solution flowed from the condenser heat exchanger component of subsystem 12 to desiccant regenerator unit 22 for regeneration. Such optional auxiliary burner 24 is normally actuated only when the latent heat load portion of the system total load is relatively much larger than the system sensible heat load portion.

Figure 2:
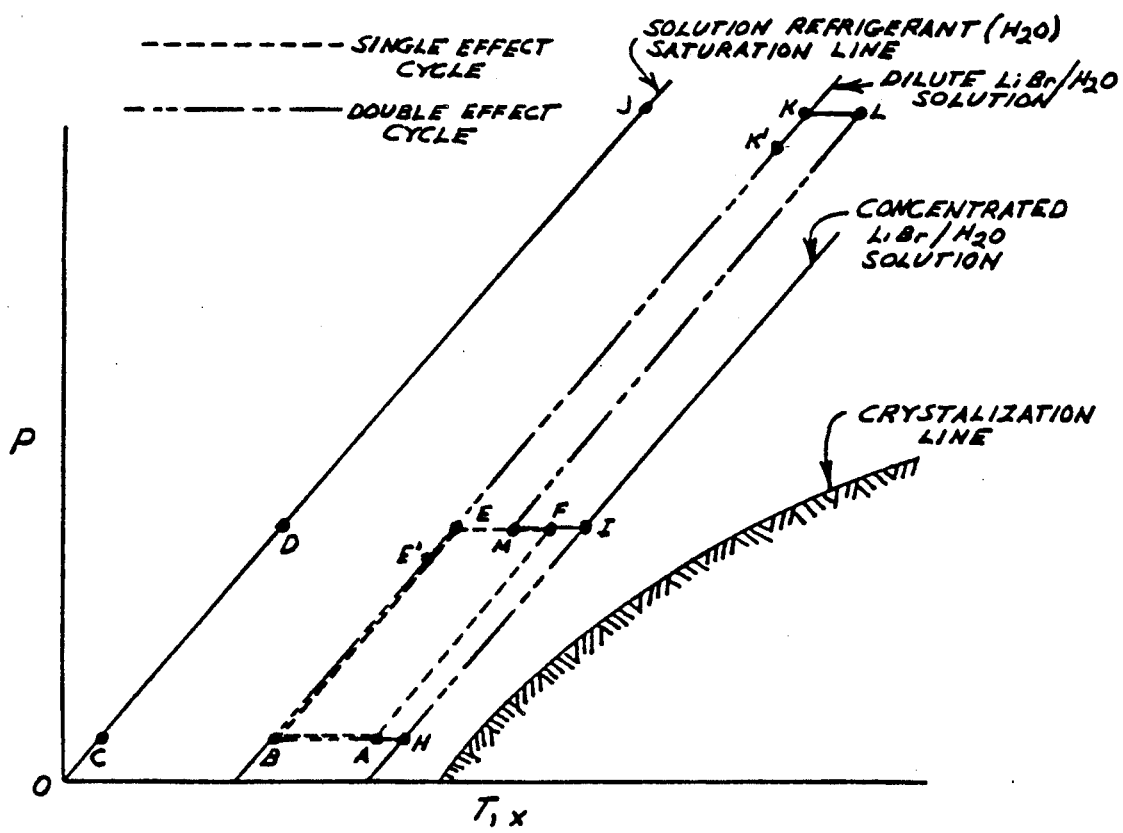
FIG. 2 is a representative P,T,x diagram for single-effect and double effect absorption refrigeration cycles optionally incorporated into the absorption refrigeration subsystem of the FIG. 1 hybrid air conditioning system.

FIG. 2 provides a diagram for a conventional double effect absorption refrigeration cycle wherein refrigerant solution vapor pressure (P) is plotted as the ordinate and vapor temperature (T) and decreasing vapor concentration (X) are plotted as abscissas. Referring to FIG. 2, points A and B bound the absorption process in a conventional single-effect cycle in which concentrated refrigerant solution at the concentration defined by Point A is diluted to its equilibrium exit condition, point B, by refrigerant vaporized at conditions represented by point C. The suppressed temperature of the evaporation, point C, accomplishes the cooling while the temperatures of the absorption process, A-B, are sufficient to reject heat to the ambient. Dilute refrigerant solution at B is pumped to a pressure sufficiently higher than the pressure at E to allow flow through the recuperative heat exchange path between points B and E. The dilute solution heated to approach point E is fed to a desorber where it is concentrated to the condition of point F by the external heat input that drives the system. This concentrated solution is cooled from point F to A as the dilute solution fed to the desorber is heated to E'. The equilibrium point E is used for convenient reference and that temperature is not usually attained by the recuperative preheat (heat exchange).

The vapor generated by the desorption process EF is condensed by cooling tower water at a condition represented by point D. The liquid refrigerant at D ($H^2O$) is reduced to the pressure at C as it is flowed into the evaporator where its evaporation accomplishes the desired cooling.

The P,T,x cycle of FIG. 2 utilizing a "double-effect" involves thermal cycling from points H to B, B to K, K to L, L to M, M to I, and I to H. Points H and B bound the absorption process in a conventional double-effect cycle in which concentrated refrigerant solution at the concentration defined by point H is diluted to its equilibrium exit condition, point B, by refrigerant vaporized at conditions represented by point C. Dilute refrigerant solution at B is pumped to a pressure sufficiently higher than the pressure at K to allow flow through a two-step recuperative heat exchange path between points B and K. The dilute solution heated to approach point E is further heated to point K and fed to a high pressure desorber where it is partially concentrated to the condition of point L by the external heat input that drives the system. This partially diluted solution is cooled from point L to point M as the concentrated solution fed to the high pressure desorber is heated from E' to K'. The equilibrium point K is used for convenient reference and that temperature is not usually attained by the recuperative pre-heat (heat exchange).

The pure refrigerant vapor (e.g., 100% water) released from the high pressure desorption process, K-L, is condensed at temperature J which is higher than the temperature between points M and I so that this condensation energy can further concentrate the solution in the low pressure desorption process between points M and I. The vapor released during the low pressure desorption (M to I) is condensed at temperature D. The low pressure condenser D rejects heat to the ambient whereas the high pressure condenser J, rejects heat to the low pressure desorber, M-I. The additional concentration of solution in the low pressure desorber is driven by heat released within the cycle (high pressure condensation at J) and is referred to as the "second effect". The fully concentrated solution at I is cooled from I to H (approximately) as it heats the dilute solution from B to E.

Figure 3A:
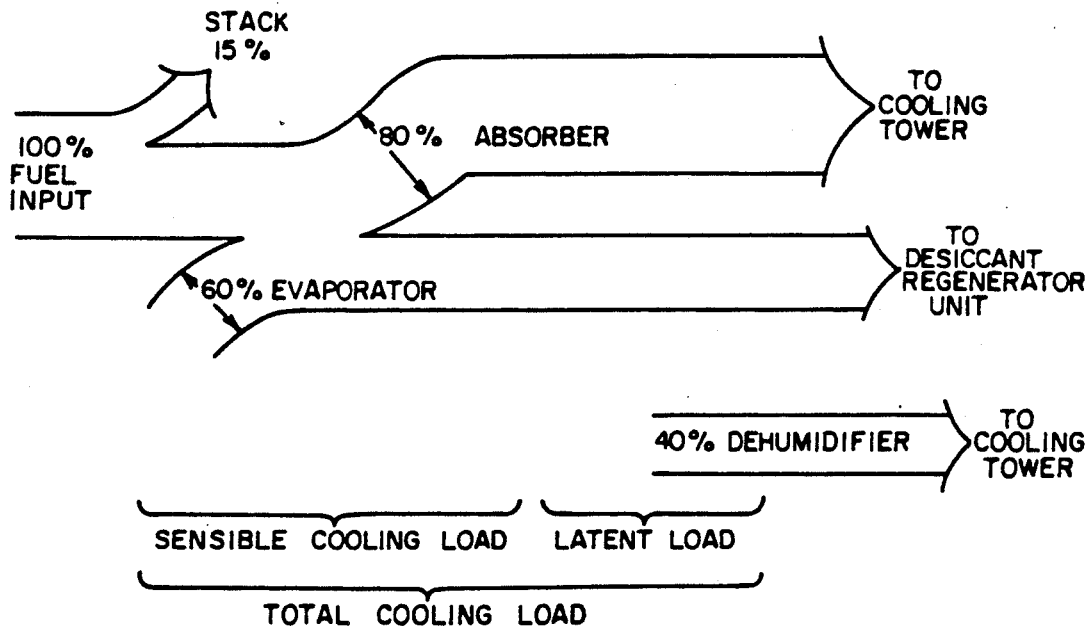
FIGS. 3A and 3B are representative energy flow diagrams for a basic hybrid air conditioning system such as the system schematically illustrated in FIG. 1 with a single-effect and double-effect absorption refrigeration cycle, respectively.

FIG. 3A is an energy flow diagram for the single-effect absorption refrigeration cycle of FIG. 2. Energy from the combustion products enters the solution desorber with some energy being lost as combustion products exhausted to the flue. Refrigerant vapor generated in the desorber is condensed into useable refrigerant liquid. As this refrigerant is condensed its condensation energy is used to regenerate the liquid desiccant circulated through the liquid desiccant dehumidification subsystem. The energy released from the absorber is conventionally rejected to the cooling tower water.

Figure 3B:
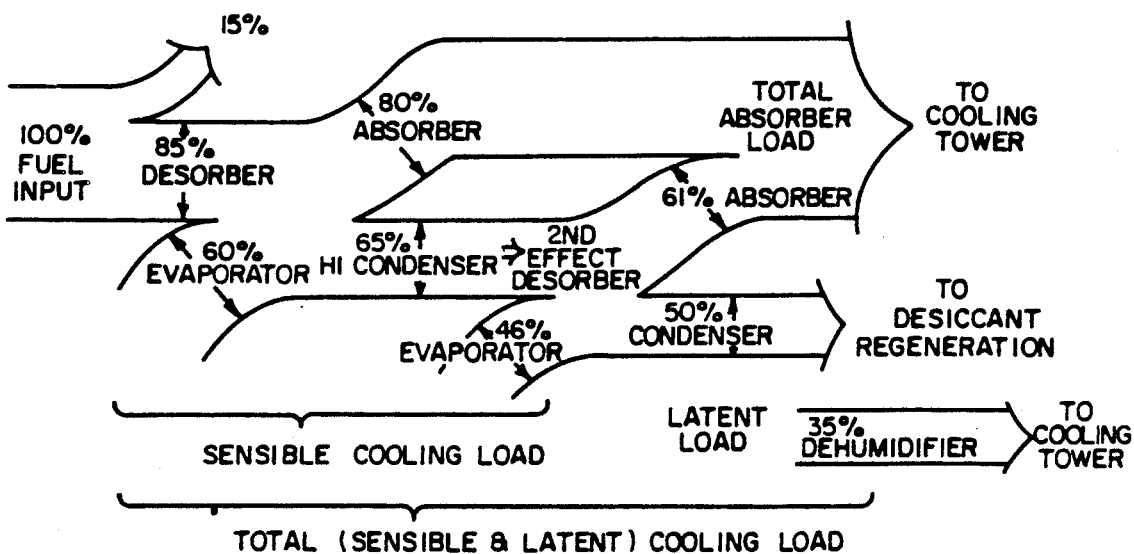

FIG. 3B is an energy flow diagram for the basic FIG. 2 double-effect cycle. Energy from the combustion products enters the first-effect solution desorber (generator) with some energy lost as the combustion products are exhausted to the flue. Refrigerant vapor is generated in the first-effect desorber and, in the process of being condensed into usable refrigerant liquid, drives additional refrigerant from solution in the second-effect desorber. As this additional refrigerant is condensed into usable liquid refrigerant its condensation energy is used to regenerate the liquid desiccant.

Although usually combined in a single evaporator, the two liquid refrigerant flows are each shown to be capable of the separate cooling effects shown on FIG. 3. Similarly, two absorption processes in which the evaporated refrigerant is (re)absorbed into solution are shown, even though the two processes occur simultaneously in one absorber. The energy released from the absorber is conventionally rejected to the cooling tower water. The evaporation processes and the absorption processes are both shown as two separate processes for thermodynamically clarity.

In the liquid desiccant dehumidifier, the desiccant solution is sufficiently concentrated that it extracts water vapor directly from the air passing through it. The energy released by the change of state of the water (from vapor to a portion of liquid solution) heats the desiccant solution which is cooled by cooling tower water. The desiccant dehumidification process has thus converted the latent load into a sensible thermal load that can be rejected from the system by the "free" evaporative cooling provided by the cooling tower.

Figure 4:
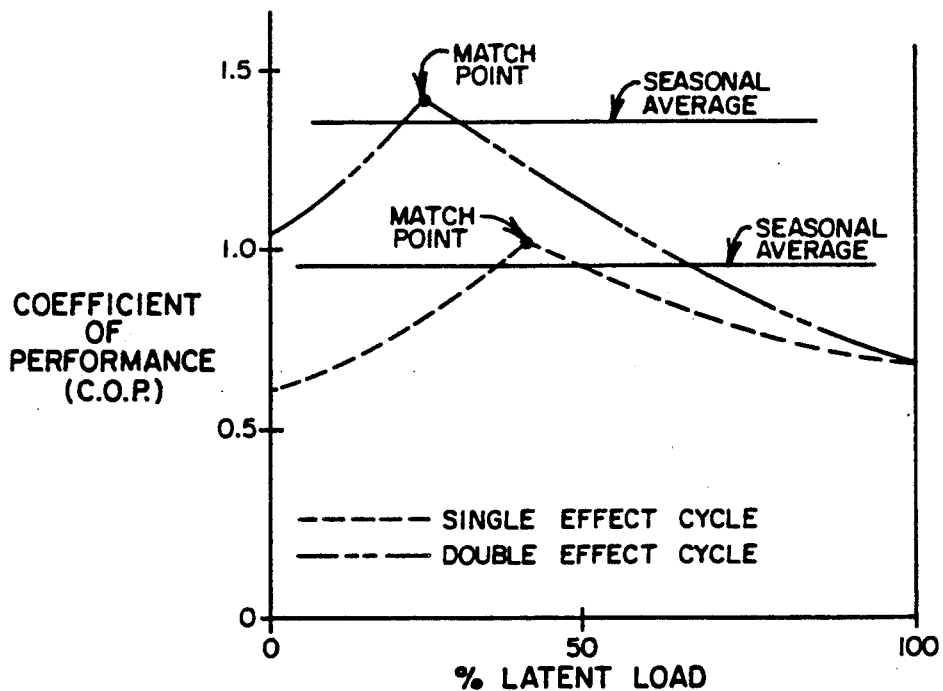
FIG. 4 is a representative plot of the overall system Coefficient of Performance (C.O.P.) of basic hybrid air conditioning system of the type illustrated in FIG. 1 as a function of latent heat load fraction.

The dehumidification capacity, however, is not defined exclusively by the cooling tower capacity. The water absorbed into the liquid desiccant solution must be removed from the desiccant so the concentrated liquid desiccant solution can be recycled to the dehumidifier. In this "regeneration" process, the desiccant is heated so that water essentially boils (evaporates) from the solution when contact with a flow of outside air occurs. The hotter the desiccant, the more water that can be driven off. But with the elevated desiccant temperature some of the regeneration energy is lost to sensible heating of both the ambient transport air and the desiccant solution itself. In practice, only slightly more than 70% of the regeneration energy actually removes water vapor from the desiccant solution so that a like amount can be added in the dehumidification process. No more latent load capability can be created than that associated with desiccant regeneration. FIG. 3A illustrates the limited latent load (46% of the fuel input to the absorber) that can be obtained from the condenser reject heat in the known basic hybrid air conditioning system. FIG. 4 shows the performance characteristics for the known basic single-effect and double-effect cycles through a plot of the pertinent overall system Coefficient of Performance (C.O.P.) as a function of the latent load fraction—the ratio of the latent load to the total load. At the extreme left ordinate, the operating condition with no latent load, the C.O.P. is 1.05, that assumed for the absorption chiller alone. As the latent load fraction increases, progressively more of the condenser reject heat is used for desiccant regeneration and the C.O.P. increases. This C.O.P. increase is accompanied by an increase in total load capacity equal to the amount of latent load. At the "Match Point", all the condenser reject heat is used for desiccant regeneration. At higher latent load ratios, the auxiliary burner 24 supplies the additional regeneration energy and the composite C.O.P. decreases. A lower C.O.P. limit of about 0.7, that of the liquid desiccant system by itself, is reached when the chiller is not fired because there is no sensible load, and all the desiccant regeneration energy is supplied by the system auxiliary burner.

Since the accumulated ton-hours of system operation over an entire season would be dominated by operation relatively close to the Match Point for most buildings, the seasonal C.O.P. is expected to be quite high, as shown illustratively on FIG. 4. In short, the basic hybrid air conditioning system has the potential to improve the operation of any given chiller by a least 25 percent, providing its condensing temperature can be increased by about 20° C. (36° F.) without exceeding structural pressure limits of the system.

In reviewing the performance characteristics depicted by FIG. 4, the most significant deficiencies exist at latent load ratios above the "Match Point". It is therefore desirable to both increase the system C.O.P. in the mid-range of latent load ratios and to avoid the substantial fall-off of performance caused by the utilization of auxiliary or supplemental energy (heat). This can be achieved in accordance with this invention in a number of different manners of system operation with correspondingly different system apparatus configurations. Basically such methods of operation and apparatus variations are keyed to the more efficient utilization of potentially available reject heat from different system sources such as multiple-effect absorption refrigeration cycles and refrigeration subsystem solution recrystallization control additives and the control of that reject heat utilization for desiccant regeneration purposes. Table 1 below introduces, by different designations, the different inventive approaches described and claimed herein.

"Reject heat" from the system condenser or absorber, or from both condenser and absorber, can be raised in temperature in different ways and be and used in varying proportions so it can be useful for desiccant regeneration purposes. The first class of desired system rejection heat modifications is identified by the first horizontal row in Table 1. In this Class I, the quantity of reject energy entering the desiccant system is "fixed". Such available desiccant regeneration heat may exceed the actual latent load regeneration heat requirement so that varying degrees of regeneration efficiency will be experienced to keep the system in balance. In essence, it is a characteristic of this class of hybrid system that the potentially recoverable "excess" regeneration energy may be switched from desiccant regeneration to simple rejection in response to a particular latent load.

It is also characteristic of this "Fixed" class of system modification that the other rejection heat source component (absorber or condenser) operates normally unless specified otherwise. In a Cf system, for example, the condenser element becomes elevated in temperature due to reduced sensible heat load and is coupled to the desiccant regenerator unit while the absorber element rejects its heat to the cooling tower at normal temperatures.

The known prior art hybrid air conditioning systems if utilizing available heat for desiccant regeneration are limited to this Cf classification. In the Af system, for example, the solution concentrations are defined so that the absorber element will operate at an elevated temperature and be coupled to the desiccant regenerator unit while the condenser element rejects its heat to the cooling tower at normal temperatures. As shown in Table 1, the third option in classification I involves operation of both the absorber and the condenser at temperatures sufficiently elevated that increased desiccant regeneration is possible.

TABLE 1

Heat Recovery Classifications

| | | Source of Recovered Heat | | |
|---|---|---|---|---|
| | | Condenser | Absorber | Both |
| I | Fixed Heat Flow | Cf | Af | CfAf |
| II | Modulated Heat Flow | Cm | Am | CmAm |
| III | Combined Fixed & Modulated | CfAm | CmAf | (CmAm) |

Also identified in Table 1 are a second (II) and a third (III) class of improved hybrid systems modification. The Class II modifications come from a desire to utilize the absorption system reject heat (made thermodynamically "more available" by raising its temperature) even when maximum desiccant regeneration is not needed. This would improve operation to the left of the "Match Point" on FIG. 4. In this Class II, the reject heat from the designated component is sufficiently elevated that it can be used for desiccant regeneration and/or for the production of refrigerant in an additional absorption cycle. The "Modulated" title refers to the progressive shifting of heat flow between two thermodynamically useful functions—desiccant regeneration and refrigerant production—in a separate ("Modulated") cycle. In the modulated configurations of this invention, desiccant regeneration improvement is developed as between elements of two absorption refrigeration cycles interconnected in a series or tandem relation. Just as two absorption cycles can be integrated so that a driving cycle can be considered a "first effect" and a second absorption cycle can be considered a "second effect" since it is arranged to be powered or driven by heat rejected from the driving cycle, "reject heat" or better "available heat" in this invention is used in two functions—for increased driving of the second absorption refrigeration cycle, for increased regeneration of liquid desiccant, or for any intermediate combination. It is from this continuously variable split of the useful available heat between the two functions (refrigerant production or desiccant regeneration) that the "modulated" classification is derived. Consistent with the classifications of the Fixed class (Class I) systems in Table 1, the following definitions are made for "Modulated" (Class II) systems:

In the Cm system, heat from the condenser in the driving absorption cycle is elevated in temperature so that it can be used for desiccant regeneration and/or for refrigerant production. The absorber heat from the driving cycle is rejected at normal temperatures to the cooling tower water. Heat from the modulated absorption cycle absorber and condenser also is rejected at normal temperatures directly to the cooling tower water.

In the Am system, heat from the absorber in the driving cycle is elevated in temperature for either desiccant regeneration and/or refrigerant production. Heat from the driving cycle condenser, from the modulated cycle condenser, and from the modulated cycle absorber goes directly to the cooling tower water. The absorption fluid in the driving cycle must run at high concentrations to achieve the required temperature elevation.

In the CmAm system, heat from both the absorber and the condenser of the driving cycle is elevated so that it can either regenerate desiccant and/or generate refrigerant in the modulated cycle whose condenser and absorber reject heat directly to the cooling tower water and operate at normal temperatures.

The third class (III) of modified hybrid air conditioning system listed in Table 1 represents the logical combinations of the two previous classes. The example that will be developed is a CmAf system in which increased temperature condenser heat from the driving cycle is modulated between desiccant regeneration and refrigerant production while the heat from the driving cycle absorber is only fed to the desiccant regeneration system. Inherent in the modulated subsystem is an additional set of absorption cycle components. The desorber is part of the modulator unit and, where the concentrations are different, a separate absorber is needed. Condensing and evaporation functions can be integrated into the driving cycle components.

No definition of the individual absorption cycle complexity is established in Table 1, but it can be assumed that, unless defined otherwise, both the input (driving) absorption cycle and the modulated absorption cycle are single-effect cycles. Subscripts 2 or 3 appended to such designations hereinafter will be utilized to indicate double-effect and triple-effect absorption refrigeration cycles when applicable. One method of identifying or designating the potentially different subsets and combinations of this invention utilizes the generalization of a Cz(r)Az(n) hybrid air conditioning system wherein: z is specified as "m" for modulated or "f" for fixed heat recovery; (r) is the number of condenser-coupled effects in the modulated cycle; and (n) is the number of condenser-coupled effects in the driving cycle. The absence of (r) or (n) implies a single effect.

Figure 5:
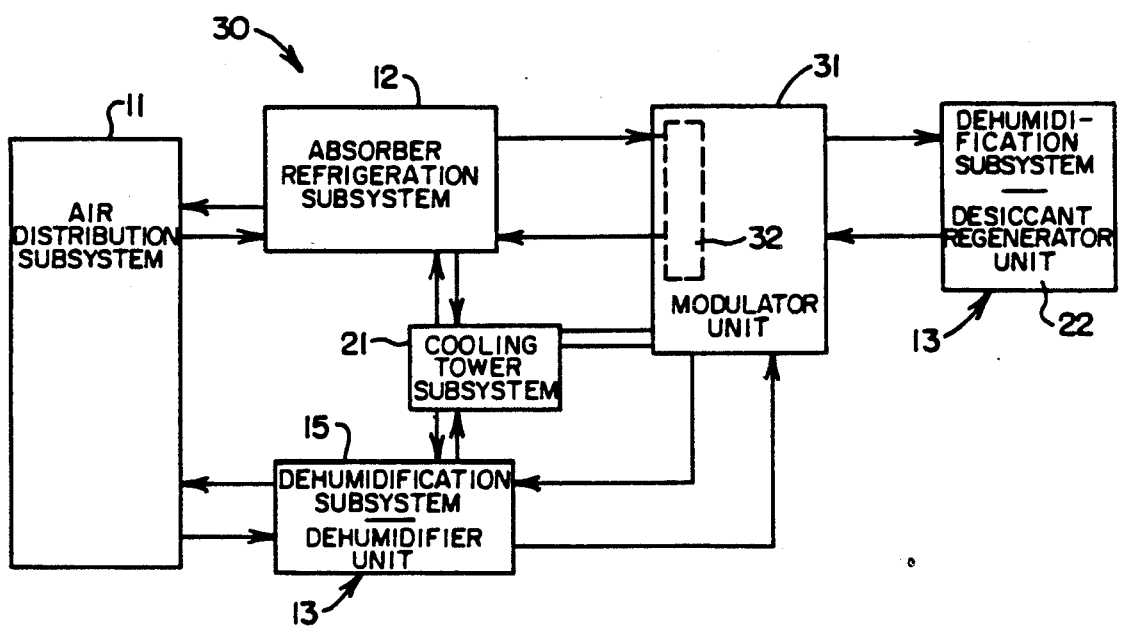
FIG. 5 is a functional block diagram of one form of a representative hybrid air conditioning system incorporating a modulator unit which integrates, in a hybrid air conditioning system, the liquid desiccant dehumidification subsystem with the absorption refrigeration system to advantageously utilize available condenser element heat.

FIGS. 5 and 6 of the drawings illustrate with block diagram depiction the modifications to the known hybrid air-conditioning system to result in two different Class II (Modulated) hybrid air conditioning systems of Table 1. The block diagram system 30 of FIG. 5 is for a Table 1 Cm-type modulated hybrid air conditioning system; the block diagram system 40 of FIG. 6 is for a Table 1 Am-type system. As defined above, the driving absorption refrigeration system 12 in FIGS. 5 and 6 could have (n) condenser-coupled effects where n equal 1,2,3, etc.

System 30 also includes a modulator unit 31 which operatively couples absorption refrigeration subsystem 12 to the desiccant regenerator unit 22 of desiccant dehumidification subsystem 13. In the case of system 40, however, the included modulator unit is designated as 41 even though generally has the same basic physical tube-in-tube heat exchanger configuration as modulator unit 31. Modulator unit 31 incorporates, as element 32, the condenser heat transfer surface of the driving cycle condenser element of absorption refrigeration subsystem 12. Modulator unit 41, on the other hand, incorporates, as element 42, the absorber heat transfer surface of the driving cycle absorber element of absorption refrigeration subsystem 12. Although modulator unit heat exchangers 32 and 42 of FIGS. 7 and 8 are illustrated as having a single tube within a tube assembly, in practice and for the reason of heat exchange surface adequacy, such units are preferred to each be constructed of multiple tube within a tube assemblies interconnected by a common vapor header and a common lower liquid collection sump. Also, the illustrated spiral fluted tube is of a commercially available configuration as is the illustrated integrally spined tube. Such spines may project either upwardly and outwardly or downwardly and outwardly without a significant degradation of performance. Further, the individual members of each tube pair are essentially in contact or near contact with each other to define a spiral passageway for desiccant solution that is restrictive to enhance heat transfer over the spiral flow path.

Figure 9:
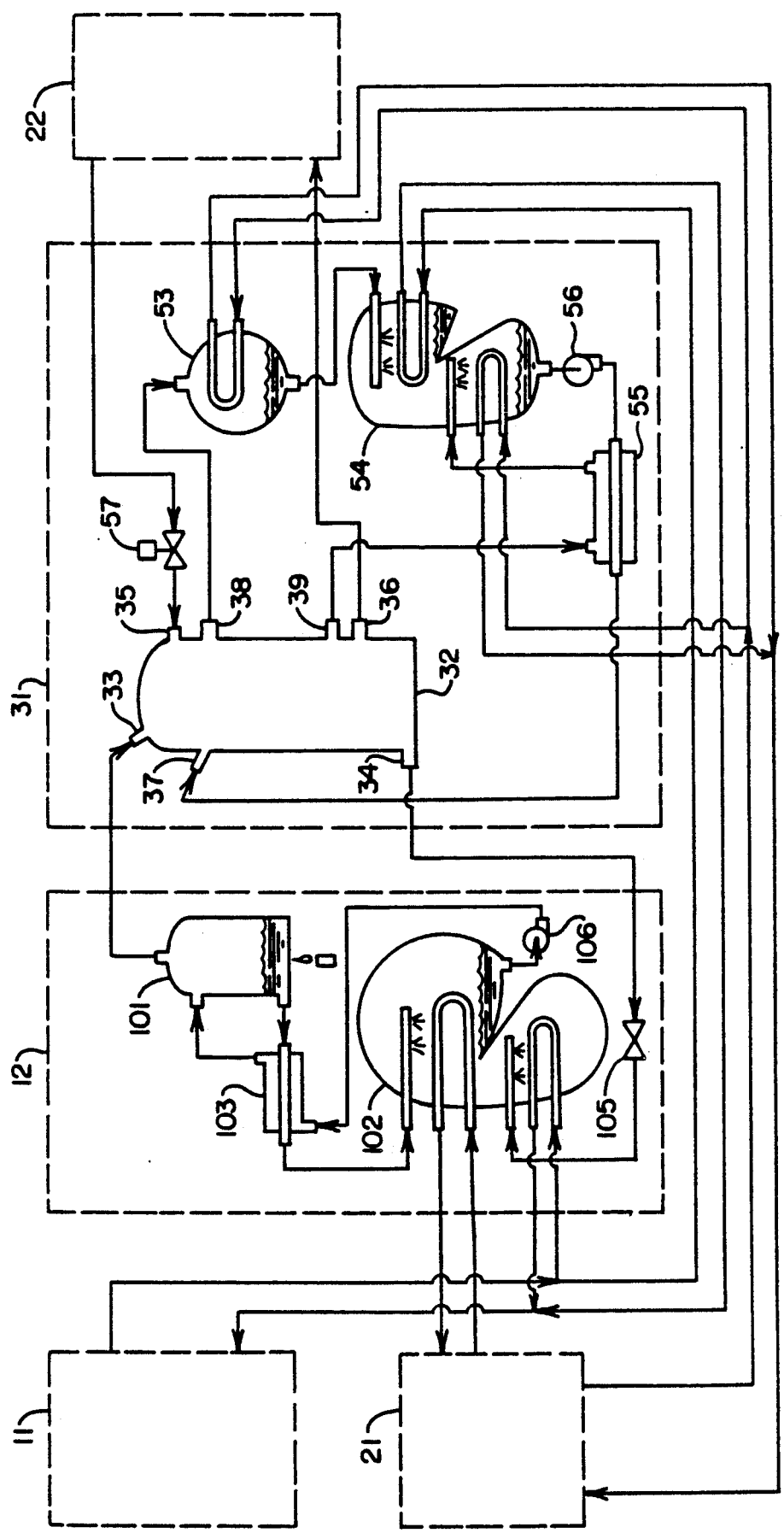
FIG. 9 is a schematic illustration of a hybrid air conditioning system of the FIG. 5 type with details of the incorporation of the system modulator unit that advantageously variably utilizes available condenser element heat.

Referring to FIGS. 7 and 9, modulator unit 31 for a condenser-modulated hybrid air conditioning system 30 has a heat exchanger assembly 32 that is provided with multiple openings 33 through 39. Relatively hot refrigerant vapor from the refrigeration subsystem desorber assembly (FIG. 9, 101) is flowed into inlet opening 33, condenses on the tubular absorption refrigeration subsystem condenser heat transfer surface 51, collects in the heat exchanger assembly 32 sump, and is afterwards flowed through outlet opening 34 to the evaporator absorber assembly (FIG. 9, 102) of the absorption refrigeration subsystem. Similarly, relatively dilute modulator unit refrigeration solution, which like the refrigeration solution of subsystem 12 may be a LiBr and H2O solution, is flowed into inlet opening 37, wets and is vaporized on the spirally-fluted tubular modulator unit desorber heat transfer surface 52, and its water vapor constituent is afterwards flowed through outlet opening 38 to the modulator unit condenser assembly (FIG. 9, 53). Concentrated modulator unit refrigeration solution collects at the bottom of the annular chamber defined by heat transfer surface 51 and the outer shell of assembly 32, and is flowed through outlet opening 39 to the heat exchanger assembly 55 and afterwards to the modulator unit absorber/evaporator assembly 54 where it absorbs the refrigerant evaporated in the cooperating element in assembly 54 Heat transfer between tubular heat transfer surfaces 51 and 52 is effected in part by the controlled and variably restricted flow of dehumidification subsystem relatively dilute desiccant solution through inlet opening 35, between tubular elements 51 and 52, and afterwards through outlet opening 36 to the system desiccant regenerator unit 22.

Referring additionally to FIG. 9, modulator unit 31 also includes a condenser assembly designated 53, an evaporator/absorber assembly 54, a further heat exchanger 55, and pump means 56 which circulates relatively dilute modulator unit refrigeration solution from evaporator/absorber 54, through heat exchanger 55, and to inlet opening 37 of heat exchanger assembly 32. Various line means are specifically shown in FIG. 9 to illustrate the flow paths of relatively hot refrigeration subsystem refrigeration solution vapor and relatively cool refrigeration liquid (H2O) to and from openings 33 and 34, of relatively cool and relatively hot dilute dehumidification subsystem desiccant solution to and from openings 35 and 36, and modulator unit refrigerant solution flows of dilute refrigerant to solution and refrigerant vapor and concentrated refrigerant solution from heat exchanger assembly openings 37, 38, and 39. Other line connections illustrating the flow paths of cooling tower water to and from subsystem 21 and chilled water to and from air distribution subsystem 11 are also shown.

Figure 10:
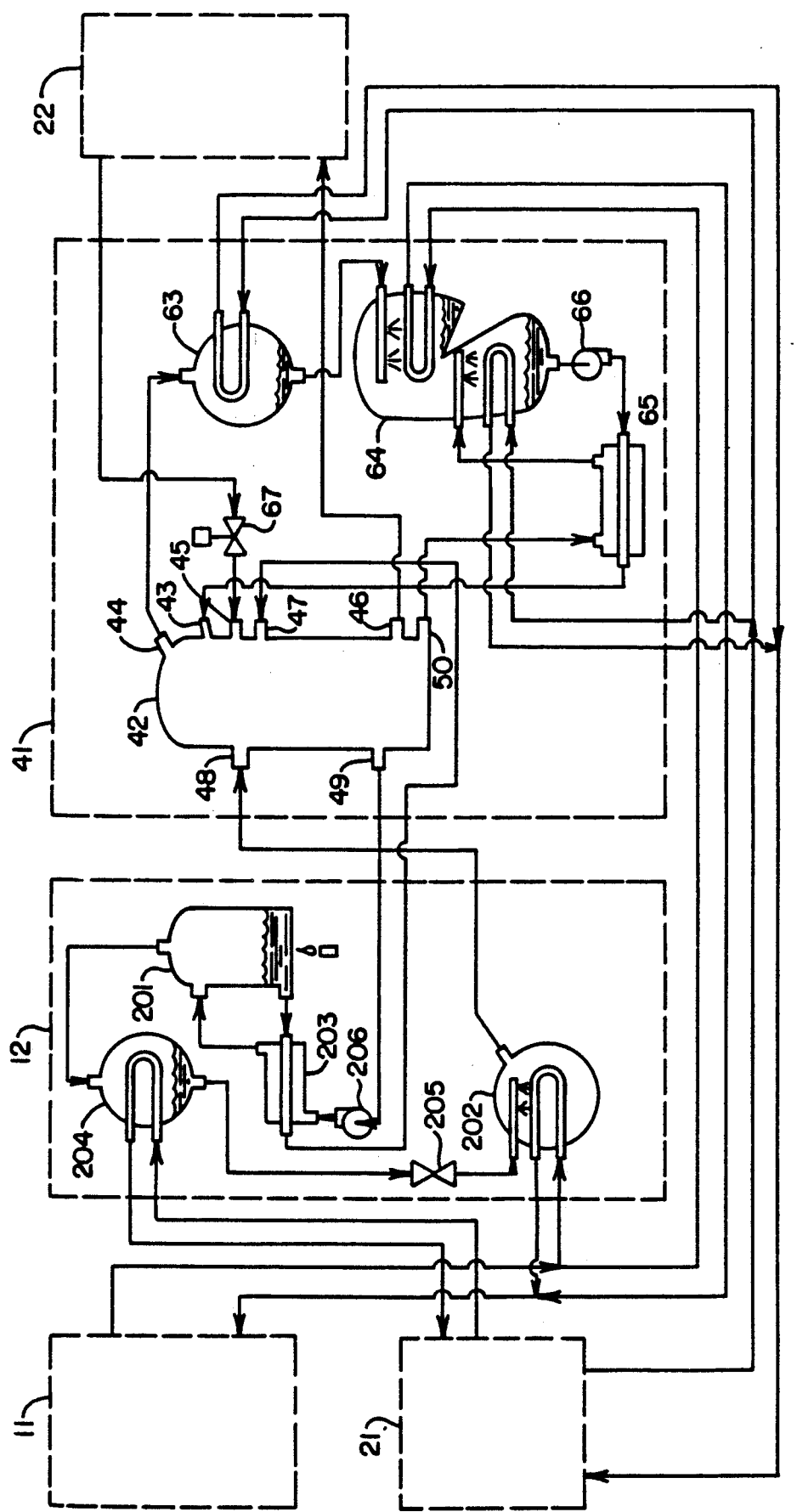
FIG. 10 is a schematic illustration of the hybrid air conditioning system of FIG. 6 with details of the incorporation of the system modulator unit that advantageously variably utilizes available absorber element heat.

As shown in FIGS. 8 and 10, modulator unit 41 has a configuration and a heat exchanger assembly 42 that differs from the modulator unit details of FIG. 7 and 9. Heat exchanger assembly 42 of the absorber modulated hybrid air conditioning system is provided with multiple openings 43 through 50. Relatively dilute modulator unit refrigerant solution is flowed from the modulator unit evaporator/absorber assembly (FIG. 10, 64) through inlet opening 43 for concentration at the desorber heat transfer surface 60 and is desorbed vapor constituent (H2O) afterwards is flowed through outlet opening 44 to the condenser assembly 63 of modulator unit 41. A more concentrated refrigerant solution collects in the lowest sump of heat exchanger assembly 42, and is flowed through outlet opening 50, through counterflow heat exchanger 65, and to evaporator/absorber assembly 64 to absorb evaporated refrigerant (vapor). Conversely, relatively concentrated refrigeration solution from the absorption refrigeration subsystem (FIGS. 10, 12) desorber assembly (FIG. 10, 201) is flowed into inlet opening 47, and simultaneously refrigeration solution vapor from the absorption refrigeration subsystem evaporator element (FIG. 10, 202) is flowed through inlet opening 48. The concentrated refrigeration solution flowed through inlet opening 47 flows over and wets the exterior surface of spined tube 61 and absorbs the refrigerant vapor received through opening 48 to produce relatively dilute refrigerant solution that is collected in the lower most extreme of the annular absorber chamber formed between tube 61 and the outer shell of heat exchanger assembly 42. The collected relatively dilute refrigeration subsystem refrigerant solution is afterwards flowed through outlet opening 49, through heat exchanger 203, and in to the system desorber assembly 201 (FIG. 10). Heat transfer between tubular desorber heat transfer surface 60 and tubular absorber heat transfer surface 61 is effected in part by the controlled and variably restricted flow of dehumidification subsystem relatively dilute desiccant solution through inlet opening 45, between tubular elements 60 and 61, and afterwards through outlet opening 46 to the system 40 desiccant regenerator unit 22. The heat generated by the absorption at surface 61 is controllably split between sensible heating of the desiccant solution entering at inlet opening 45 and the desorption of refrigerant (H2O) from the relatively dilute refrigeration solution entering at inlet opening 43.

Referring additionally to FIG. 10, modulator unit 41 also includes a condenser assembly designated 63, an evaporator/absorber assembly 64, a further heat exchanger 65, and a pump means 66 which circulates relatively dilute modulator unit refrigeration solution from evaporator/absorber assembly 64, through heat exchanger 65, and to inlet opening 43 of heat exchanger assembly 42. Various line means are additionally shown in FIG. 10 to illustrate the flow paths of modulator unit refrigeration solution relatively dilute liquid and vapor constituents to and from openings 43 and 44, of absorption refrigeration subsystem refrigeration solution concentrated liquid, vapor, and dilute liquid constituents to inlet openings 47 and 48 and from outlet opening 49, and also dehumidification subsystem relatively dilute desiccant solution to and from openings 45 and 46. Other line connections illustrating flow paths of cooling tower water to and from subsystem 21 in system 40 and chilled water to and from air distribution subsystem 11 in system 40 are also illustrated in FIG. 10.

Modulator units 31 and 41 each include a valve, 57 or 67, which responds to a system "Humidistat" sensor and which controls or throttles the flow of dehumidification subsystem dilute desiccant solution to desiccant regenerator unit 22 for concentration in response to detected changes in the actual proportion of system sensible and latent heat loads. Also shown in the drawings are conventional absorption refrigeration subsystem expansion valves 105, 205 and also circulation pumps 106 and 206, which accomplish the flow of relatively dilute refrigeration solution in their respective absorption refrigeration subsystems.

Figure 11:
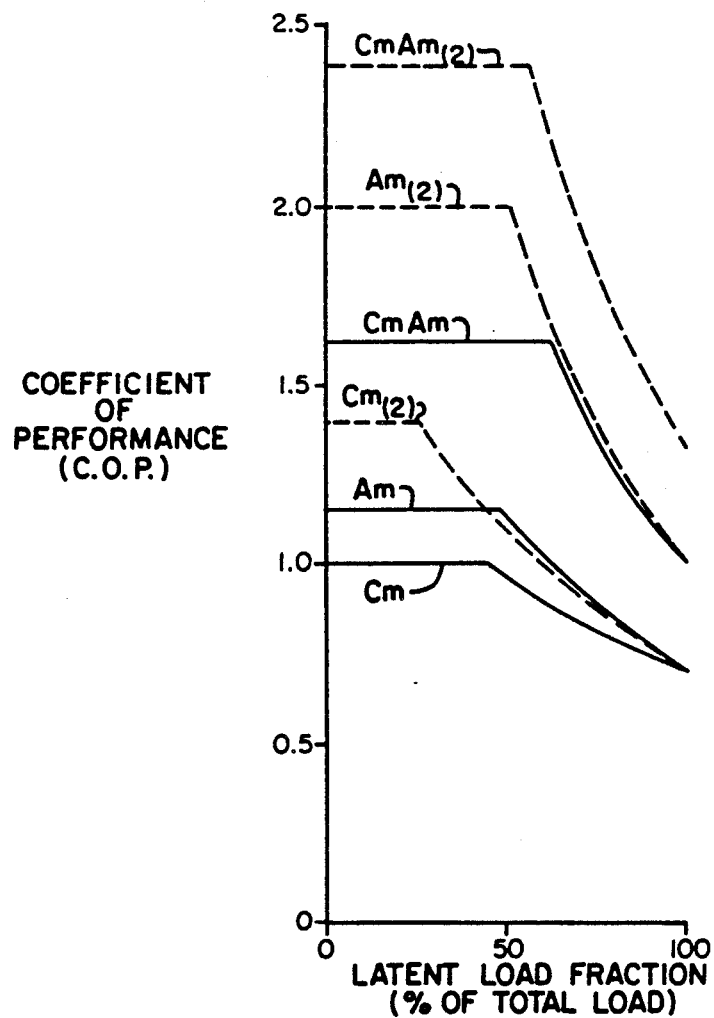
FIG. 11 provides representative plots of the overall system Coefficient of Performance (C.O.P.) for each of several cases in one subset of hybrid air conditioning system modifications of this invention.

From a study of the delineated different hybrid air conditioning systems it becomes apparent that the primary cooling coils in the air distribution subsystem that received chilled water from evaporator 102 or 202 need not be cold enough to control humidity but it is important that the chilled water temperature be kept above the dewpoint of the processed air so that they will remain dry and allow the desiccant dehumidification subsystem to control air humidity level without interference. This means that an evaporator temperature of 50° to 55° F. should normally prove acceptable if the building air dewpoint is not less than 58° F. A number of different evaporator refrigeration cycles can be matched to the modulator unit to avoid chilled water coil moisture condensation and the Coefficient of Performance characteristics of the different cycles are illustrated in FIG. 11 with their respective absorption refrigeration cycle appropriately indicated.

For the Cm type subsystem an auxiliary burner (FIG. 1, 24) will be required if the system latent load factor exceeds about 40%. For the Cm(2) type subsystem, the maximum pressure for the double-effect absorption refrigeration cycle can be held to less than approximately one atmosphere gage if properly designed. In the Am cycle solution concentration is increased so that heat will be provided to the modulator unit and any required refrigeration solution formulation changes or solution additive changes are moderate and achievable. Similar solution concentration and additive adjustments are in order for the Af(n) subsystem cycles although the degree of adjustment required is less for Af(n) cycles than for Am(n) cycles.

The performance plots CmAm and Cm(2)Am(2) relate to dual-coupled subsystem single-effect and double-effect cycles wherein available heat is taken simultaneously from the refrigeration subsystem condenser and from the refrigeration subsystem absorber thereby increasing system Coefficient of Performance over the single-coupled subsystem cycles (Cm(1) or Am(1) for example). Cycle maximum pressures for the latter dual-coupled system are well above any applicable one atmospheric gage pressure code restriction.

Figure 12:
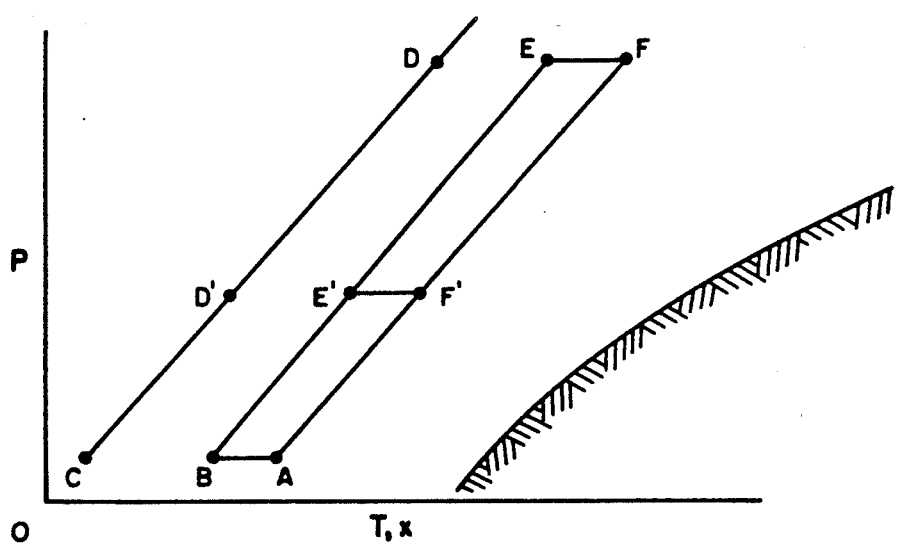
FIG. 12 is a P,T,x diagram for the modulated single-effect absorption refrigeration subsystem cycle of the hybrid air conditioning system illustrated in FIGS. 5 and 9.

In FIG. 12 I provide a P,T,x diagram for a representative Cm absorption refrigeration subsystem single-effect refrigeration cycle. When no desiccant regeneration is required (0% latent heat load), the single-effect driving absorption refrigeration cycle loop is from A to B to E to F to A with refrigerant-saturation conditions at corresponding points C and D. (See explanation above for FIG. 2, single-effect cycle). The single-effect modulated absorption cycle loop is from A to B to E′ to F′ to A when no heat is diverted to the desiccant loop for desiccant regeneration. It is, of course, logical that this P,T,x diagram is identical with a parallel-flow double-effect absorption cycle. The condensation process at D is hot enough to heat desiccant solution for regeneration whenever that is desired. When modulation occurs in the modulator unit to achieve an increased degree of desiccant regeneration, the single-effect driving cycle does not change but the concentration span between E′ and F′ shrinks since less heat is available for refrigerant production. The absorbers for the driving cycles and the modulator cycle can be merged into one unit physically since the leaving concentration at B is common. Other double-effect cycle arrangements, such as the series flow arrangement illustrated in FIG. 2, can be combined into a Cm type of hybrid air conditioning system.

Figure 13:
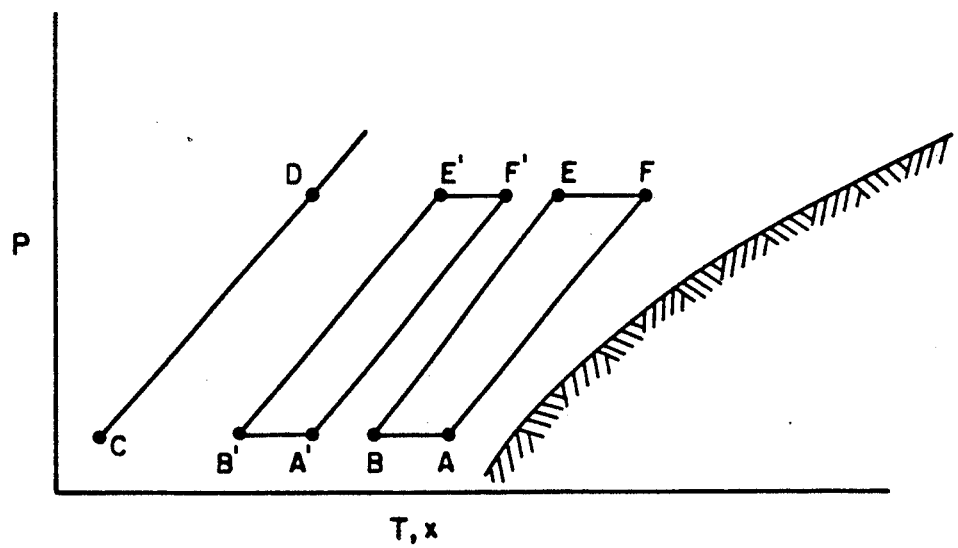
FIG. 13 is a P,T,x diagram for the single-effect absorption refrigeration subsystem cycle of the hybrid air conditioning system illustrated in FIGS. 6 and 10.

Similarly, the P,T,x diagram of FIG. 13 illustrates the single-effect absorption refrigeration cycle characteristics of an absorber-coupled modulator unit arrangement (Am(1) system). When no desiccant regeneration is required, the absorption refrigeration cycle loop is from A to B to E to F to A with refrigerant saturation conditions at points C and D. If no available heat is transferred from refrigerant production to desiccant regeneration, the modulated refrigeration cycle loop becomes A′ to B′ to E′ to F′ to A′ with the same refrigerant saturation points C and D as the heat from absorption process A to B drives the modulated cycle desorption process from E′ to F′. As this heat is diverted to the desiccant regeneration, the concentration span from E′ to F′ shrinks.

Figure 14:
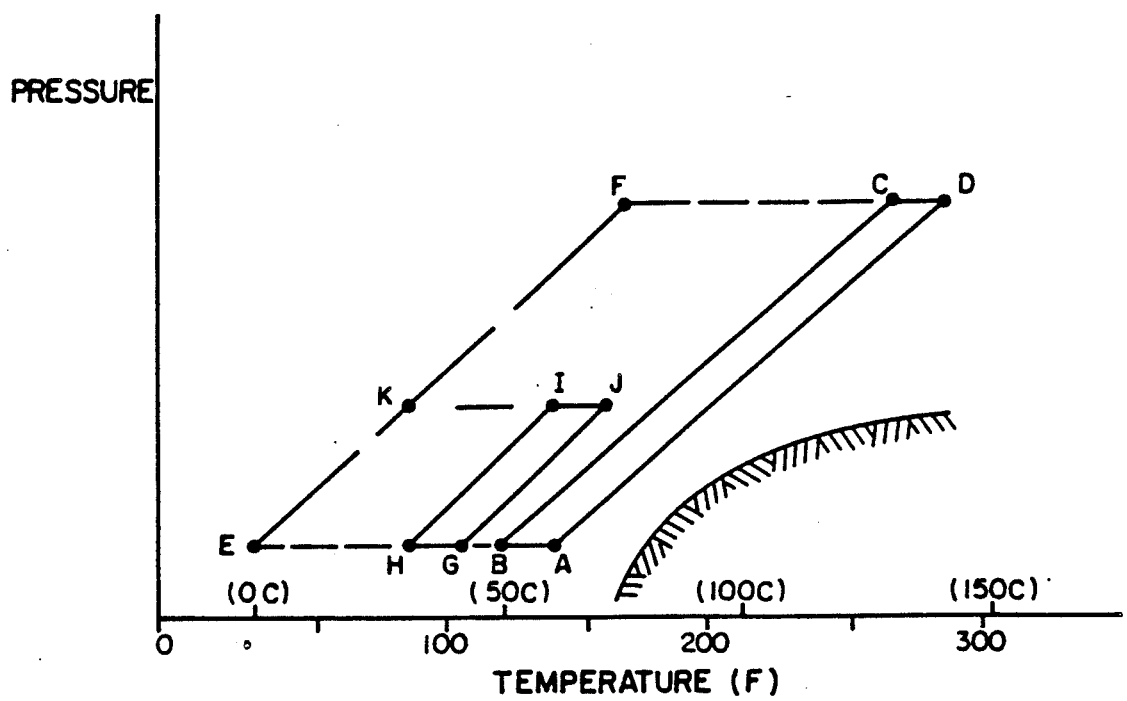
FIG. 14 is a P,T,x diagram for a Class III or combined fixed and modulated heat recovery modification to hybrid air conditioning system absorption refrigeration subsystem refrigeration cycle.
Figure 15:
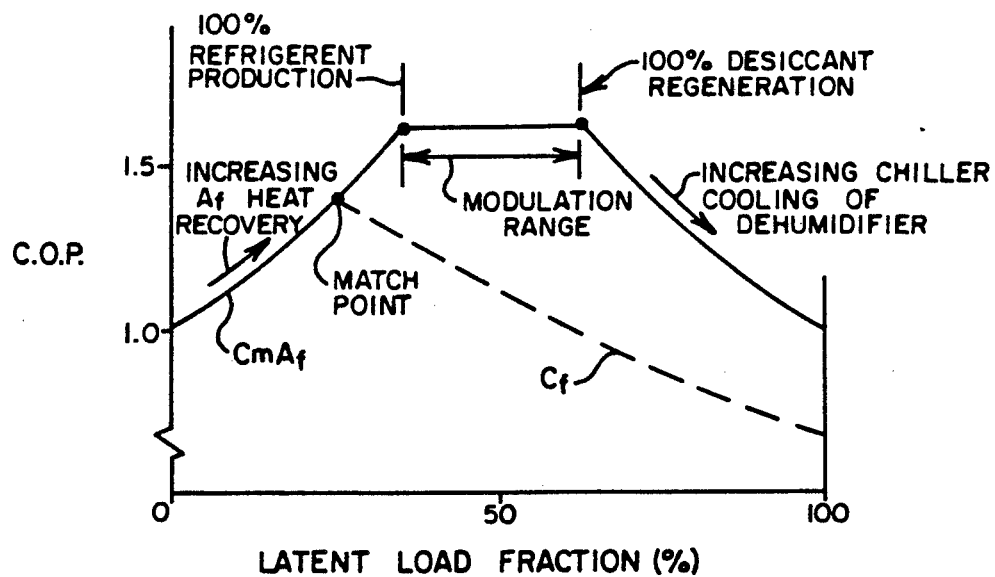
FIG. 15 is a representative plot of the overall system Coefficient of Performance (C.O.P.) of the hybrid air conditioning system cycle of FIG. 14.

FIGS. 14 and 15 are P,T,x and C.O.P. plots for a representative combined condenser-coupled and absorber-coupled system in which only available condenser heat is modulated. Such system is denoted a CmAf system, the single-effect characteristic being implied for both the driving and modulator unit cycles. As in many other cases, when absorber pressure levels can be raised, solution crystallization concerns are reduced. In the FIG. 14 plot, the refrigeration driving cycle is from A to B to C to D to A with refrigerant saturation at E and F. The modulator unit absorption cycle loop extends from G to H to I to J to G with the modulator units' condenser refrigerant solution condition being at point K. The temperature at point F is sufficiently elevated that it can provide heat for the desorption process I to J, but the solution temperatures in the absorber (A to B) are elevated only enough for desiccant regeneration and are not at temperatures high enough to transfer heat to the desorption from I to J.

FIG. 15 shows the representative performance of the CmAf cycle as the latent heat load varies over the full range. At the zero latent load condition the C.O.P. is that of a double-effect absorption machine (e.g., C.O.P.

of 1.0). At lower latent load fractions, no desiccant flow is sent to the modulator unit and all available heat from the driving cycle condenser is used to drive the modulated tandem absorption refrigeration cycle. The driving cycle absorber provides progressively more heat for desiccant regeneration as the latent load increases. In the middle latent load range, all the heat from the driving cycle desorber is used for desiccant regeneration, and the C.O.P. is relatively constant because it is perceived that desiccant regeneration derived from condenser heat at F is as thermodynamically advantageous as driving the tandem absorption cycle. The descending portion of the FIG. 15 C.O.P. curve at high latent load fractions does not involve use of an auxiliary heat source for desiccant regeneration. Instead, some of the refrigeration subsystem evaporative cooling capacity is used to cool the dehumidification process, thus lowering the temperature requirements for desiccant regeneration when no system sensible load exists, the cooling of the dehumidification process becomes the only sensible load imposed on the refrigeration subsystem evaporator, and this heat is in effect added to the input from the auxiliary burner to provide an enhanced amount of heat for desiccant regeneration. FIG. 15 shows the impact of this "heat pumping" effect on system C.O.P. at normal desiccant regeneration efficiencies. The chiller cooling of the dehumidification process will allow more dilute desiccant concentration to be used which in turn will improve regeneration efficiency and therefore improve total system C.O.P.s in the high latent load fraction region.

A hybrid air conditioning system with the refrigeration subsystem evaporator sized for maximum sensible heat load will operate at part load virtually all the time. Because humidity control is not compromised at part load, improved comfort control is a bonus.

Figure 16:
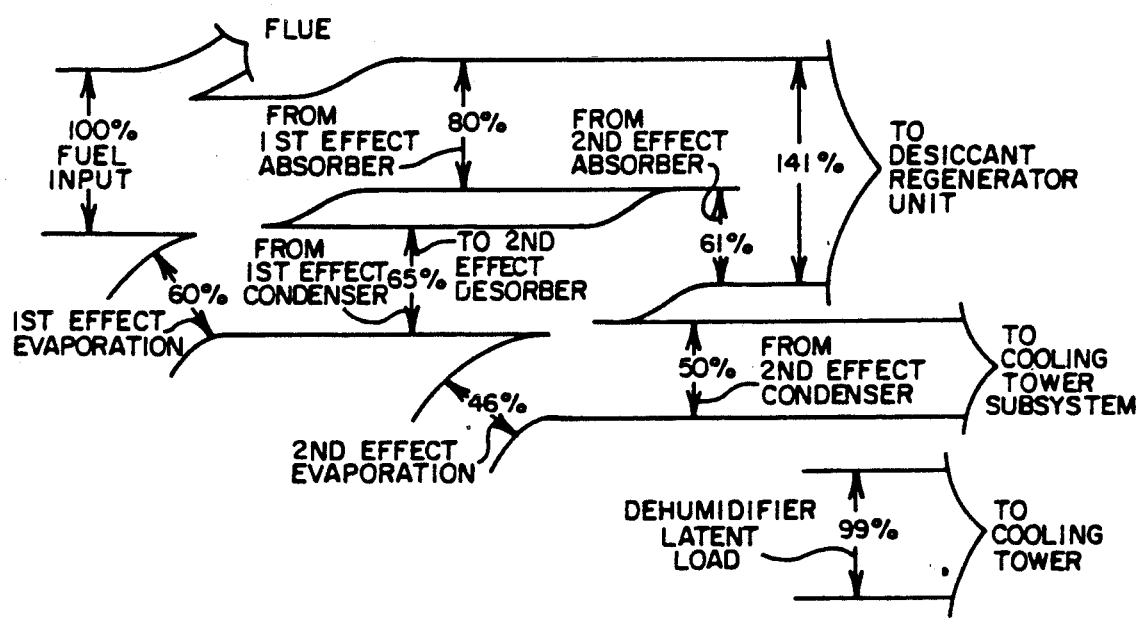
FIG. 16 is an energy flow diagram for an Af(2) type of hybrid air conditioning system.

Further system operating advantages may be realized if the disclosed two separate refrigeration solution loops which function in tandem are merged into one loop with a wide solution concentration range and the absorber heat used only for desiccant regeneration. This simple merger can be accomplished if the driving effect cycle becomes a double-effect cycle with the refrigeration subsystem absorber element operating over a broader concentration range and without modulated condenser recovery. The energy flow diagram of FIG. 16 confirms the desirability of this approach which is an implementation of an Af(2) type hybrid system as defined in Table 1. In an Af(2) type hybrid system the maximum available heat recovered from the driving cycle combined first and second-effect absorber elements very nearly equals the amount of heat recovered from the separate absorber and condenser elements in a CmAf type hybrid system (FIGS. 14 and 15), but none of the regeneration heat is heat diverted from refrigerant production. FIG. 16 shows the improved C.O.P. over the CmAf system to be limited in the mid-range. Where this mid-range dominates the cooling season, this is an effective alternative to the CmAf system.

The functional block diagram and system schematic illustration for such Af(n) type hybrid system are essentially similar to like illustrations for the Cf or Cf(2) type hybrid system correspondingly illustrated in the aforesaid U.S. patent application Ser. No. 07/302,428 except that the available heat for desiccant regeneration is taken by heat exchange or heat transfer from the absorption refrigeration subsystem absorber rather than from the absorption refrigeration subsystem condenser.

Figure 18:
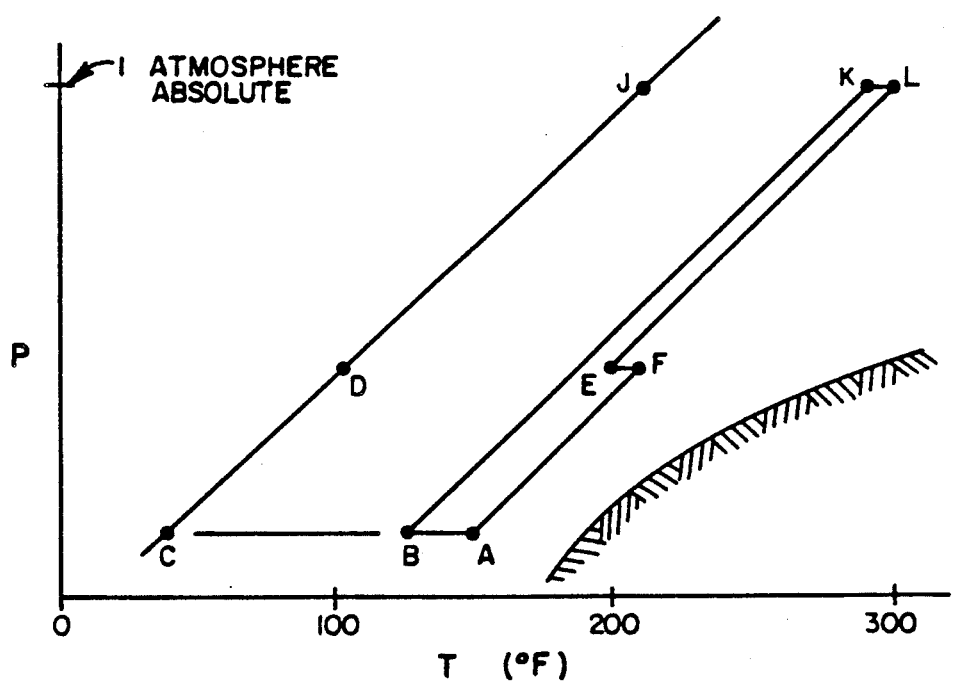
FIG. 18 is a P,T,x diagram generally similar to the plot of FIG. 11, except that the absorption refrigeration cycle is essentially a double-effect type cycle modified for desiccant heat recovery only from the absorber.
Figure 19:
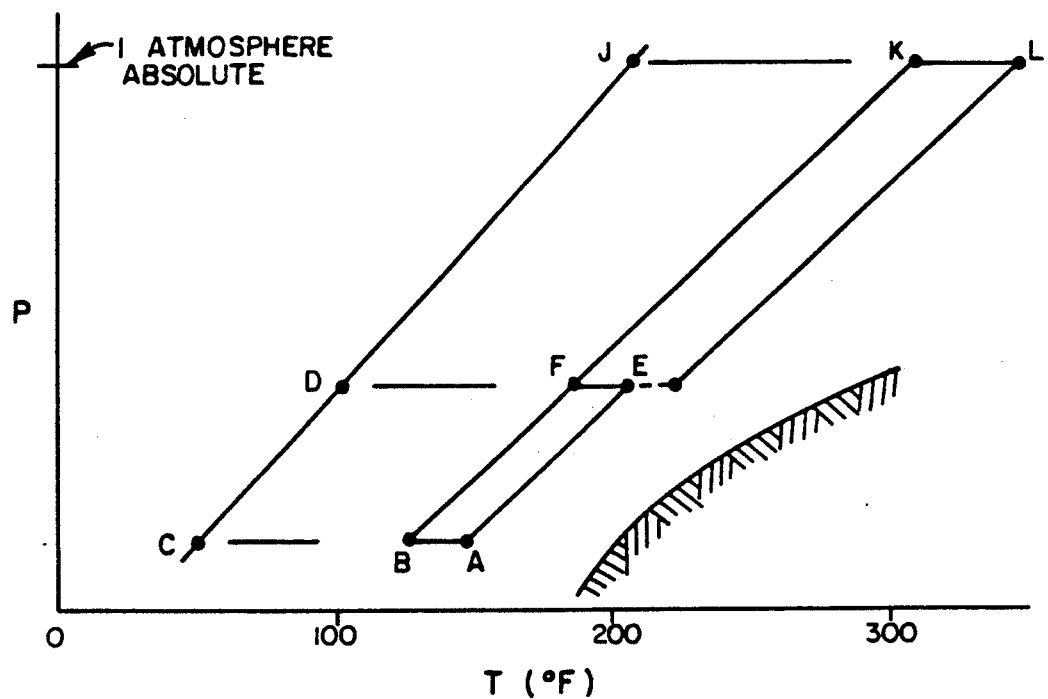
FIG. 19 is an alternative configuration P,T,x diagram to the system cycle illustrated in FIG. 18.
Figure 20:
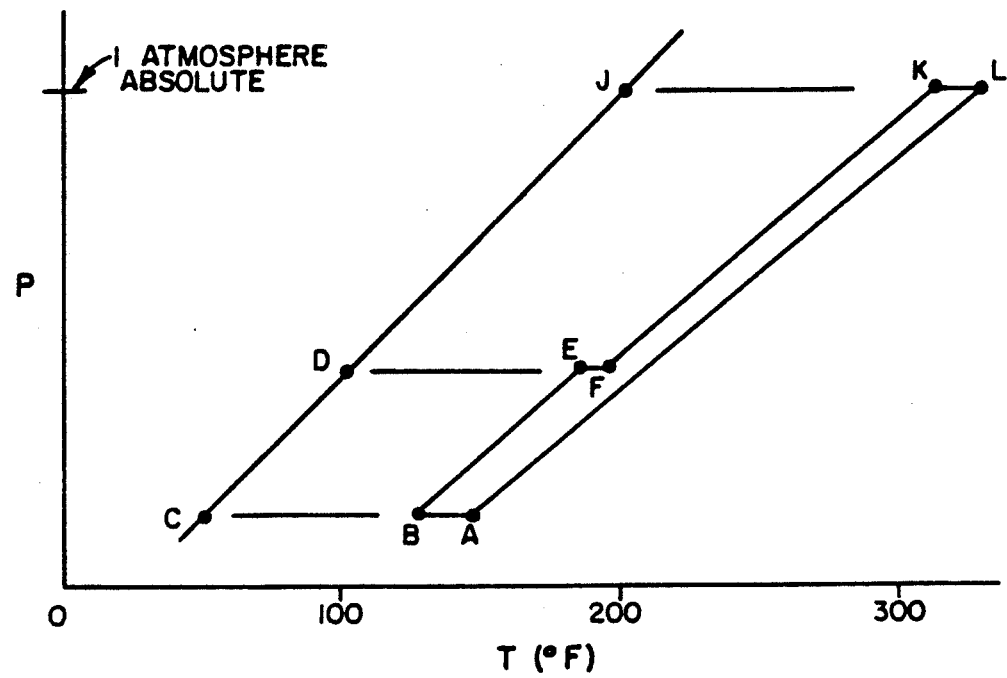
FIG. 20 is an unconventional alternative configuration P,T,x diagram that allows lower peak pressures than the system cycles illustrated in FIGS. 17 or 18.

Depending on system permissible maximum operating pressure, the refrigeration double-effect cycle may take the form of a series flow double-effect cycle (FIG. 18) or a parallel flow double effect cycle (FIG. 19). The FIG. 18 cycle is pressure (line J-K-L) can be lower than the peak pressure of the series cycle of FIG. 18.

It is also possible to modify the Af(2) type system absorption refrigeration cycle in the manner indicated by the P,T,x diagram of FIG. 19 to further reduce the maximum system operating pressure. Such requires the operation of an additional refrigeration solution circulation pump at solution temperatures above normal (e.g., 200° F.) to feed partly concentrated solution through the heat exchanger—F to K and to the desorber K to L. Advantageously, the desorber pressure at L is fully available to force flow concentrated refrigeration solution back through the solution heat exchangers to the subsystem absorber element. Such an Af(2) system appears capable of operating at a peak pressure less than atmospheric, an advantage in some areas of the world where restrictive operating codes apply. For a relatively simple "spin-down" procedure to avoid solution crystallization after the shut-down of the subsystem desorber element driving burner it is only necessary to continue operating the circulation pumps through system cool-down to acceptable solution concentrations. Only modest quantities of anti-crystallization additives should be needed in this refrigeration subsystem absorption cycle approach.

Figure 17:
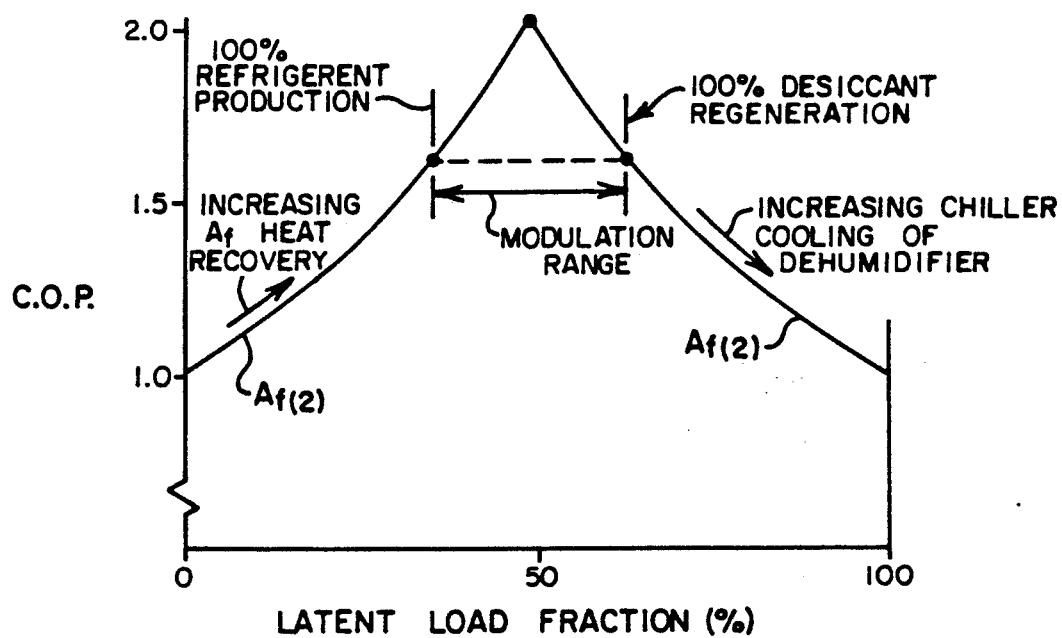
FIG. 17 is a representative plot of the overall system Coefficient of Performance (C.O.P.) for the Af(2) system.
Figure 21:
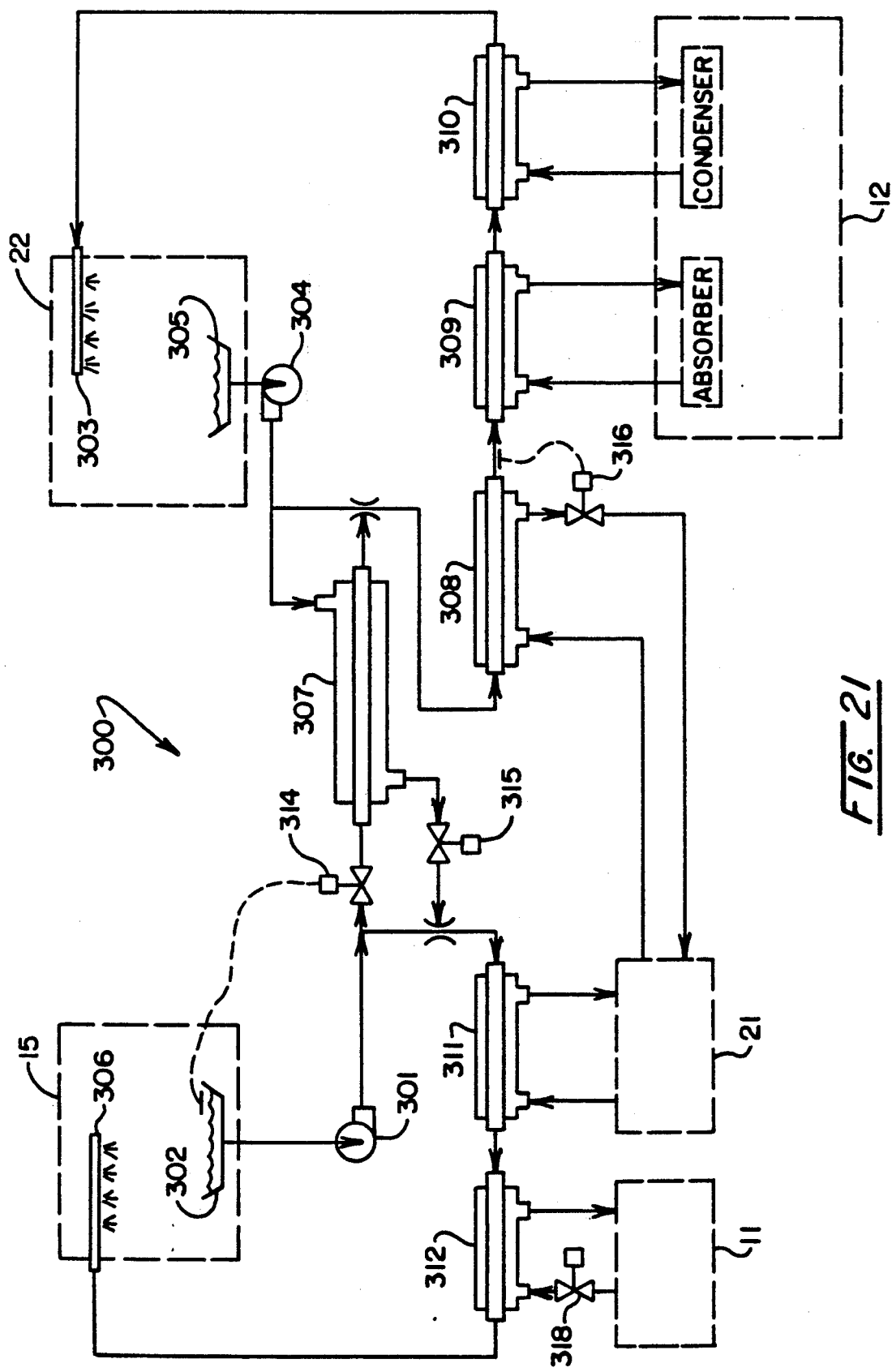
FIG. 21 is a schematic illustration of preferred desiccant solution control loops for use with a hybrid air conditioning for interconnecting the system dehumidifier unit and regenerator unit elements.

The desiccant solution flow control loop 300 schematically illustrated in FIG. 21 may be provided in the foregoing hybrid air conditioning systems of different designations to effect convenient system adjustment to load variations which require either increasing the recovery of available heat or increasing the cooling of desiccant solution by heat transfer to chilled water cooled by the refrigeration subsystem evaporator. Such increases respectively increase the system Coefficient of Performance in the regions of proportionately low and proportionately high system latent heat loads. For instance, the increased C.O.P. obtained in the Cm Am, Am(2), and CmAm(2) cycles of FIG. 11 over the remaining cycles wherein the C.O.P. equals approximately 0.7 may be achieved by the utilization of the FIG. 21 arrangement to cool the desiccant with chilled water, thus recovering heat for regeneration and eliminating the need of an auxiliary heat source such as a supplementary burner assembly. This is a critically advantageous trade-off since periods of excessive latent load are usually accompanied by low sensible loads. The total system capacity has the same shape as the C.O.P. plots in these examples. The high latent load factor regions (right-hand portion) of FIGS. 15 and 17 show this same improvement obtained by the utilization of the FIG. 21 arrangement.

Referring to FIG. 22, relatively concentrated desiccant solution is flowed by pump means 304 from the sump 305 of desiccant regenerator unit 22 for subsequent cooling and spraying from nozzles 306 of desiccant dehumidifier unit 15. Heat exchangers 307, 311 and 312 and control valves 314 through 316, and 318 are provided in the connecting lines of control loop 300 in the manner shown for selective utilization and actuation for acceptance of the latent heat load and the cooling of desiccant solution when latent heat loads are relatively low (e.g., 0% to 25-50%).

With respect to the disclosed valving, valve 314 is responsive to the fluid level in sump 302 and is closed when further air dehumidification within dehumidifier unit 15 is not possible. Thus, a relatively dilute desiccant solution will continue to be circulated by pump means 301. When air dehumidification is required, valve 315 is opened in response to the signal from its' humidistat and adds concentrated desiccant to the flow sprayed from nozzle 306. This extracts moisture from the air and causes the level of fluid in sump 302 to rise so valve 314 is opened to flow dilute desiccant solution to regenerator unit 22 through heat exchangers 307 through 310. During periods of excessive latent load, insufficient desiccant regeneration will have occurred so that insufficient dehumidification will occur with valve 315 wide open. Continued dehumidification demand will actuate valve 318, providing a second stage of dehumidification control. Opening valve 318 admits a flow of chilled water from the refrigeration subsystem 11 to heat exchanger 312 to lower temperatures than were possible by the cooling tower 12 in heat exchanger 311 not only increases the dehumidification capability of the given desiccant solution but it increases the load on the chiller which increases the heat available for desiccant regeneration. Valve 316 is responsive to the temperature of the concentrated solution leaving heat exchanger 308 and is normally closed when system latent heat loads are proportionately high. The refrigeration subsystem 12 absorber element provides available heat to the flowed or recirculated desiccant solution through heat exchanger 309 if the system is designated (defined) as an Am or an Af system. Similarly, heat exchanger 310, which may optionally be provided in those Cm or Cf designated systems which have refrigeration cycles developing adequate high condenser temperatures for desiccant heating, will reject its heat to the flowed desiccant solution. For Am and Cm systems the heat is rejected directly to the desiccant (see FIGS. 7 and 8) so heat exchangers 309 and 310 should be considered as schematic. In addition, these systems by their nature only reject heat to the desiccant when dehumidification is needed. However, for Af and Cf type systems, the reject heat is delivered to the desiccant regeneration. If the dilution of the desiccant in the dehumidifier unit is less than the concentration caused by the excessive reject heat, the temperature, the temperature controlling valve 316 will increase. Opening valve 316 admits cool water from cooling tower subsystem 21 so that the desiccant is cooled in heat exchanger 308 so that its regeneration will match the dehumidification. Closing of valve 316 accompanies the rise of C.O.P. from 0% latent load conditions such as displayed on the plots of FIGS. 4, 15, and 17. As indicated previously, the incorporation of desiccant solution control loop 300 into a hybrid air conditioning system is particularly advantageous when the system otherwise has a low Coefficient of Performance (e.g., as low as 0.7) under 100% latent load conditions.

It has been understood that although the present invention has been specifically disclosed with the preferred embodiments and examples, modifications and variations of the concepts herein disclosed may be resorted to by those skilled in the art. Such modifications and variations, for example flattening the sensor tip or altering the sensing element geometry, are considered to be within the scope of the invention and the appended claims.

I claim:

1. A hybrid air conditioning system subjected to a combined and proportionally variable sensible heat load and latent heat load, and comprising:
   a. An absorption refrigeration subsystem handling the system sensible heat load and having an absorption refrigeration cycle loop with cooperating desorber means, condenser means, evaporator means, absorber means, and fluid circulating means flowing refrigerant vapor, liquid refrigerant, relatively concentrated refrigeration solution, and relatively dilute refrigeration solution;
   b. A liquid desiccant dehumidification subsystem handling the system latent heat load and having cooperating desiccant dehumidifier means, desiccant regenerator means, and fluid circulating means flowing desiccant solution sequentially through said desiccant dehumidifier means and said desiccant regenerator means; and
   c. Modulator means cooperably connected to said refrigeration subsystem and to said dehumidification subsystem and having a modulator absorption refrigeration cycle loop separate from said refrigeration subsystem absorption refrigeration cycle loop with cooperating desorber means, condenser means, evaporator means, absorber means and fluid circulating means flowing refrigerant vapor, liquid refrigerant, concentrated refrigeration solution, and dilute refrigeration solution, said modulator means transferring available heat between said refrigeration subsystem absorption refrigeration cycle loop, said dehumidification subsystem desiccant solution, and said modulator absorption refrigeration cycle loop in controlled proportions to thereby improve the system coefficient of performance.

2. The system defined by claim 1 and further comprising modulator heat exchanger means, said modulator heat exchanger means functioning as said refrigeration subsystem condenser means and simultaneously cooling said refrigeration subsystem refrigerant vapor and heating said dehumidification subsystem desiccant solution and said modulator absorption refrigeration cycle loop desorber means.

3. The system defined by claim 1 and further comprising modulator heat exchanger means, said modulator heat exchanger means functioning as said refrigeration subsystem absorber means and simultaneously cooling said refrigeration subsystem refrigeration solution and heating said dehumidification subsystem desiccant solution and said modulator absorption refrigeration cycle loop desorber means.

4. The system defined by claim 1 and further comprising first modulator heat exchanger means functioning as said refrigeration subsystem condenser means and second modulator heat exchanger means functioning as said refrigeration subsystem absorber means, said first modulator heat exchanger means simultaneously cooling said refrigeration subsystem refrigerant vapor and heating said dehumidification subsystem desiccant solution and said modulator absorption refrigeration cycle loop desorber means, and said second modulator heat exchanger means simultaneously cooling said refrigeration subsystem refrigeration solution and heating said dehumidification subsystem desiccant solution and said modulator absorption refrigeration cycle loop desorber means.

5. The system defined by claim 1 wherein said refrigeration subsystem absorption refrigeration cycle loop is a multiple-effect absorption refrigeration cycle loop.

6. The system defined by claim 5 wherein said refrigeration subsystem absorption refrigeration cycle loop is a double-effect absorption refrigeration cycle loop with a first desorption effect at a high cycle pressure and a second desorption effect at a cycle pressure substantially lower than said high cycle pressure and receiving heat from condensing refrigerant vapor at said high cycle pressure.

7. The system defined by claim 1 wherein said modulator absorption refrigeration cycle loop is a multiple-effect absorption refrigeration cycle loop.

8. The system by claim 7 wherein said modulator absorption refrigeration cycle loop is a double-effect absorption refrigeration cycle loop with a first desorption effect at a high cycle pressure and a second desorption effect at a cycle pressure substantially lower than said high cycle pressure and receiving heat from refrigerant vapor at said high cycle pressure.

9. The system defined by claim 1 wherein said refrigeration subsystem absorption refrigeration cycle loop and said modulator absorption refrigeration cycle loop are each a multiple-effect absorption refrigeration cycle loop.

10. The system defined by claim 9 wherein said refrigeration subsystem absorption refrigeration cycle loop and said modulator absorption refrigeration cycle loop are each a double-effect absorption refrigeration cycle loop, each double-effect loop having a first desorption effect at a high cycle pressure and a second desorption effect at a cycle pressure substantially lower than said high cycle pressure and receiving heat from refrigerant vapor at said high cycle pressure.

11. The system defined by claim 1 wherein said dehumidification subsystem fluid circulation means is cooperably connected to said modulator means and includes a throttling valve means responsive to detected relative humidity conditions indicative of actual system latent heat load magnitude to vary the flow of desiccant solution to and from said modulator means.

12. The system defined by claim 2 wherein said dehumidification subsystem fluid circulating means is cooperably connected to said modulator heat exchanger means and includes a throttling valve means responsive to detected relative humidity conditions indicative of actual system latent heat load magnitude to vary the flow of desiccant solution to and from said modulator heat exchanger means.

13. The system defined by claim 3 wherein said dehumidification subsystem fluid circulating means is cooperably connected to said modulator heat exchanger means and includes a throttling valve means responsive to detected relative humidity conditions indicative of actual system latent heat load magnitude to vary the flow of desiccant solution to and from said modulator heat exchanger means.

14. The system defined by claim 4 wherein said dehumidification subsystem fluid circulation means is cooperably connected to said first modulator heat exchanger means and to said second modulator heat exchanger means, and includes throttling valve means responsive to detected relative humidity conditions indicative of actual system latent heat load magnitude to vary the flow of desiccant solution to and from each of said modulator heat exchanger means.

15. The system defined by claim 2 wherein said refrigeration subsystem absorption refrigeration cycle loop absorber means cooperates in heat transfer relation with said dehumidification subsystem fluid circulating means to also heat said dehumidification subsystem desiccant solution.

16. The system defined by claim 15 wherein said refrigeration subsystem absorption refrigeration cycle loop is a multiple-effect absorption refrigeration cycle loop.

17. The system defined by claim 16 wherein said refrigeration subsystem multi-effect absorption refrigeration cycle loop is a double-effect absorption refrigeration cycle loop with a first desorption effect at a high cycle pressure, with a second desorption effect at a cycle pressure substantially lower than said high cycle pressure and receiving heat from condensing refrigerant vapor at said high cycle pressure, and with said modulator absorption refrigeration cycle loop condenser means receiving heat from condensing refrigerant vapor at said lower cycle pressure.

18. The system defined by claim 15 wherein said modulator absorption refrigeration cycle loop is a multiple-effect absorption refrigeration cycle loop.

19. The system defined by claim 18 wherein said multiple-effect absorption refrigeration cycle loop is a double-effect absorption refrigeration cycle loop with a first desorption effect at an intermediate cycle pressure and receiving heat from condensing refrigerant vapor at a pressure substantially higher than said intermediate pressure, with a second desorption effect at a cycle pressure substantially lower than said intermediate cycle pressure and receiving heat from condensing refrigerant vapor at said intermediate cycle pressure, and with said second desorption effect being in variable heat transfer relation with said dehumidification subsystem desiccant solution.

20. The system defined by claim 3 wherein said refrigeration subsystem absorption refrigeration cycle loop condenser means cooperates in heat transfer relation to said dehumidification subsystem fluid circulating means to also heat said dehumidification subsystem desiccant solution.

21. The system defined by claim 20 wherein said refrigeration subsystem absorption refrigeration cycle loop is a multiple-effect absorption refrigeration cycle loop.

22. The system defined by claim 21 wherein said multiple-effect absorption refrigeration cycle loop is a double-effect absorption refrigeration cycle loop with a first desorption effect at a high cycle pressure and a second desorption effect at a cycle pressure substantially lower than said high cycle pressure and receiving heat from refrigerant vapor at said high cycle pressure.

23. The system defined by claim 20 wherein said modulator absorption refrigeration cycle loop condenser means cooperates in heat transfer relation to said dehumidification subsystem fluid circulating means to heat said dehumidification subsystem desiccant solution.

24. The system defined by claim 23 wherein said modulator absorption refrigeration cycle loop is a multiple-effect absorption refrigeration cycle loop.

25. The system defined by claim 24 wherein said multiple-effect absorption refrigeration cycle loop is a double-effect absorption refrigeration cycle loop with a first desorption effect at an intermediate cycle pressure and receiving heat from condensing refrigerant vapor at a pressure substantially higher than said intermediate pressure, with a second desorption effect at a cycle pressure substantially lower than said intermediate cycle pressure and receiving heat from condensing refrigerant vapor at said intermediate cycle pressure, and with said second desorption effect being in variable heat transfer relation with said dehumidification subsystem desiccant solution.

26. The system defined by claim 14 and further comprising:
   d) A cooling tower subsystem having a recirculated coolant and rejecting heat from said recirculated coolant to the system ambient atmosphere; and
   e) An additional heat exchanger means cooperably connected to said cooling tower subsystem and to said dehumidification subsystem fluid circulating means, said additional heat exchanger means variably transferring heat from said dehumidification subsystem desiccant solution to said cooling tower subsystem recirculated coolant in response to system variations correlated to desiccant solution temperatures above a threshold level and indicative of a relatively low system latent heat proportionate load.

27. The system defined by claim 26 wherein said refrigeration system absorption refrigeration cycle loop is a multiple-effect absorption refrigeration cycle loop.

28. The system defined by claim 27 wherein said refrigeration subsystem multi-effect absorption refrigeration cycle loop is a double-effect loop with a first absorption effect at high cycle pressure, with a second desorption effect at a cycle pressure substantially lower than said high cycle pressure and receiving heat from condensing refrigerant vapor at said high cycle pressure, and with said modulator absorption refrigeration cycle loop condenser means receiving heat from condensing refrigerant vapor at said lower cycle pressure.

29. The system defined by claim 20 and further comprising:
   d) Separate fluid circulation means flowing chilled coolant from a heat transfer relation to said refrigeration subsystem absorption refrigeration cycle loop evaporator means to handle the system sensible heat load;
   e) A first heat exchanger means cooperably connected to said separate fluid circulation means and to said dehumidification subsystem fluid circulating means;
   f) A cooling tower subsystem having a recirculated coolant and rejecting heat from said recirculated coolant to the system ambient atmosphere; and
   g) A second heat exchanger means cooperably connected to said cooling tower subsystem and to said dehumidification subsystem fluid circulating means intermediate said first heat exchanger means and said dehumidification subsystem desiccant regenerator means, said first heat exchanger means variably transferring heat from said dehumidification subsystem desiccant solution to said separate fluid circulation means in response to system variations correlated to desiccant solution temperatures above a threshold level and indicative of a relatively high system latent heat proportionate load.

30. The system defined by claim 29 wherein said refrigeration subsystem absorption refrigeration cycle loop is a multi-effect absorption refrigeration cycle loop.

31. The subsystem defined by claim 30 wherein said refrigeration subsystem multi-effect absorption refrigeration cycle loop is a double-effect loop with a first absorption effect at high cycle pressure, with a second desorption effect at a cycle pressure substantially lower than said high cycle pressure and receiving heat from condensing refrigerant vapor at said high cycle pressure, and with said modulator absorption refrigeration cycle loop condenser means receiving heat from condensing refrigerant vapor at said lower cycle pressure.

* * * * *